(12) United States Patent
Konishi et al.

(10) Patent No.: US 10,666,131 B2
(45) Date of Patent: May 26, 2020

(54) DEAD-TIME VOLTAGE COMPENSATION APPARATUS AND DEAD-TIME VOLTAGE COMPENSATION METHOD

(71) Applicant: INDUSTRIAL TECHNOLOGY RESEARCH INSTITUTE, Hsinchu (TW)

(72) Inventors: Yoshihiro Konishi, Hsinchu (TW); Yeh-Hsiang Ho, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/211,551

(22) Filed: Dec. 6, 2018

(65) Prior Publication Data

US 2020/0127556 A1   Apr. 23, 2020

(30) Foreign Application Priority Data

Oct. 17, 2018   (TW) .............................. 107136611 A

(51) Int. Cl.
*H02M 7/5387*   (2007.01)
*H02M 1/38*   (2007.01)
*H02M 1/00*   (2006.01)

(52) U.S. Cl.
CPC ......... *H02M 1/38* (2013.01); *H02M 7/53873* (2013.01); *H02M 2001/0009* (2013.01); *H02M 2001/385* (2013.01)

(58) Field of Classification Search
CPC .......... H02M 7/42; H02M 7/48; H02M 7/487; H02M 7/493; H02M 7/501; H02M 7/4826;
(Continued)

(56) References Cited

U.S. PATENT DOCUMENTS 8,385,092 B1   2/2013   Shekhawat
8,432,709 B2   4/2013   Huang et al.
(Continued)

FOREIGN PATENT DOCUMENTS

CN   166087   11/1997
CN   102237848   11/2011
(Continued)

OTHER PUBLICATIONS

Taiwanese Decision of Grant for Taiwanese Patent Application No. 107136611 dated Apr. 10, 2019.
(Continued)

*Primary Examiner* — Bryan R Perez
(74) *Attorney, Agent, or Firm* — Amin, Turocy & Watson, LLP

(57) ABSTRACT

A dead-time voltage compensation apparatus and a dead-time voltage compensation method are provided. The method includes: converting a DC voltage of an input end of a single-phase DC-AC inverter into a unipolar AC voltage; calculating first to third current values based on a first inductor current value of a inductor, calculating first voltage compensation amounts of a first dead-time and a third dead-time of an AC voltage and a second inductor current value of the AC voltage based on polarities of the first to third current values, calculating fourth to sixth current values based on the second inductor current value, calculating second voltage compensation amounts of a second dead-time and a fourth dead-time of the AC voltage based on polarities of the fourth to sixth current values, and compensating a control reference signal of a processor based on the first and second voltage compensation amounts.

20 Claims, 16 Drawing Sheets

(58) Field of Classification Search
CPC ...... H02M 7/49; H02M 7/4807; H02M 7/537; H02M 7/5387; H02M 7/533; H02M 7/53; H02M 2007/4803; H02M 2007/4822; H02M 1/38; H02M 7/53873

See application file for complete search history.

(56) References Cited

U.S. PATENT DOCUMENTS

| | | | |
|---|---|---|---|
| 9,083,255 | B2 | 7/2015 | Duan et al. |
| 9,621,039 | B2 | 4/2017 | Yamada |
| 9,771,098 | B2 | 9/2017 | Mikamo et al. |
| 10,103,647 | B2 | 10/2018 | Huang et al. |
| 2013/0193938 | A1 | 8/2013 | Shook |
| 2015/0015197 | A1 | 1/2015 | Mi et al. |
| 2016/0118911 | A1 | 4/2016 | Huang et al. |
| 2017/0117821 | A1* | 4/2017 | Kato ............ H02M 7/537 |
| 2017/0214354 | A1* | 7/2017 | Yamakawa ........ F24F 1/0007 |

FOREIGN PATENT DOCUMENTS

| | | |
|---|---|---|
| CN | 102651622 | 8/2012 |
| CN | 102684536 | 9/2012 |
| CN | 102882413 | 1/2013 |
| CN | 103516249 | 5/2016 |
| CN | 105634311 | 6/2016 |
| CN | 103795234 | 6/2017 |
| TW | 201240298 | 10/2012 |
| TW | 201304381 | 1/2013 |
| TW | I422136 | 1/2014 |
| TW | 201616799 | 5/2016 |
| TW | I535177 | 5/2016 |
| TW | I626459 | 6/2018 |

OTHER PUBLICATIONS

Vu, et al. "A New Adaptive Dead-Time Compensation for Single-Phase Grid-Connected PV Inverter", APEC; 2011; 923-930.

Lee, et al. "A Direct Compensation Scheme of the Dead-Time Effect in PWM-VSI", IAS; 2012; 1-6.

Wang, et al. "Mixed PWM for Dead-Time Elimination and Compensation in a Grid-Tied Inverter", IEEE Transaction; 2011; 4797-4803.

Li, et al. "Dead-Time Compensation for VSI Based Power Supply with Small Filter Inductor", IPEMC; 2009; 1519-1523.

Wang, et al. "An Adaptive Dead-time Compensation Method for Sinusoidal PWM-controlled Voltage Source Inverter with Output LC", APEC; 2011; 778-785.

Kim, et al. "On-Line Dead-Time Compensation Method Using Disturbance Observer", IEEE Transactions on Power Electronics, vol. 18, No. 6, Nov. 2003, 1336-1345.

Munoz, et al. "On-Line Dead-Time Compensation Technique for Open-Loop PWM-VSI Drives", IEEE Transactions on Power Electronics, vol. 14, No. 4, Jul. 1999, 683-689.

\* cited by examiner

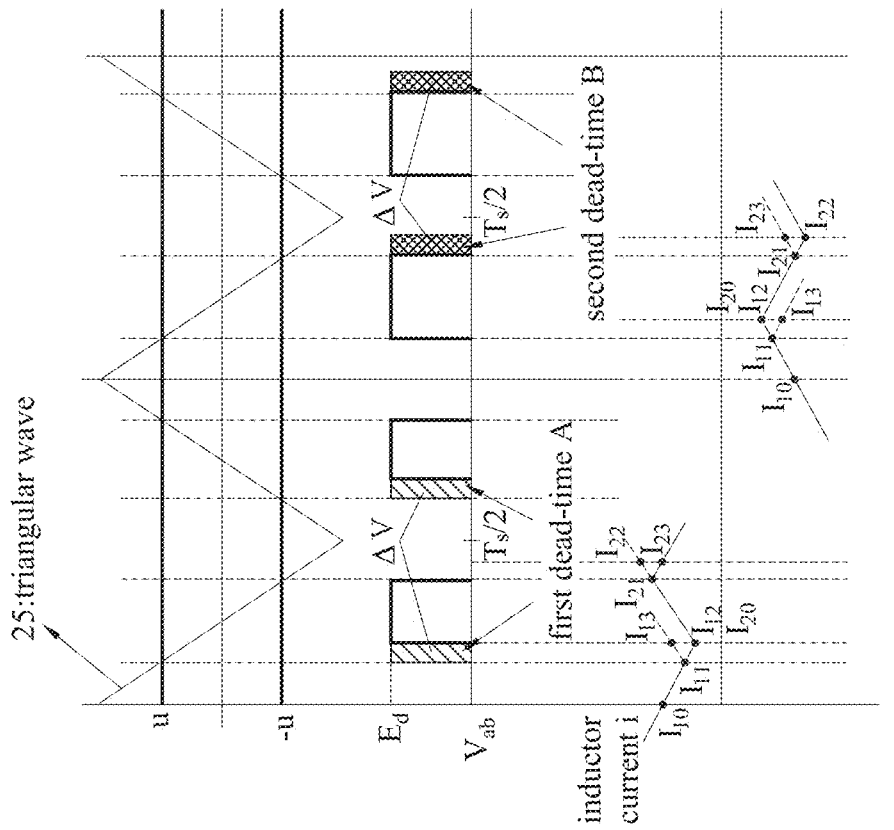
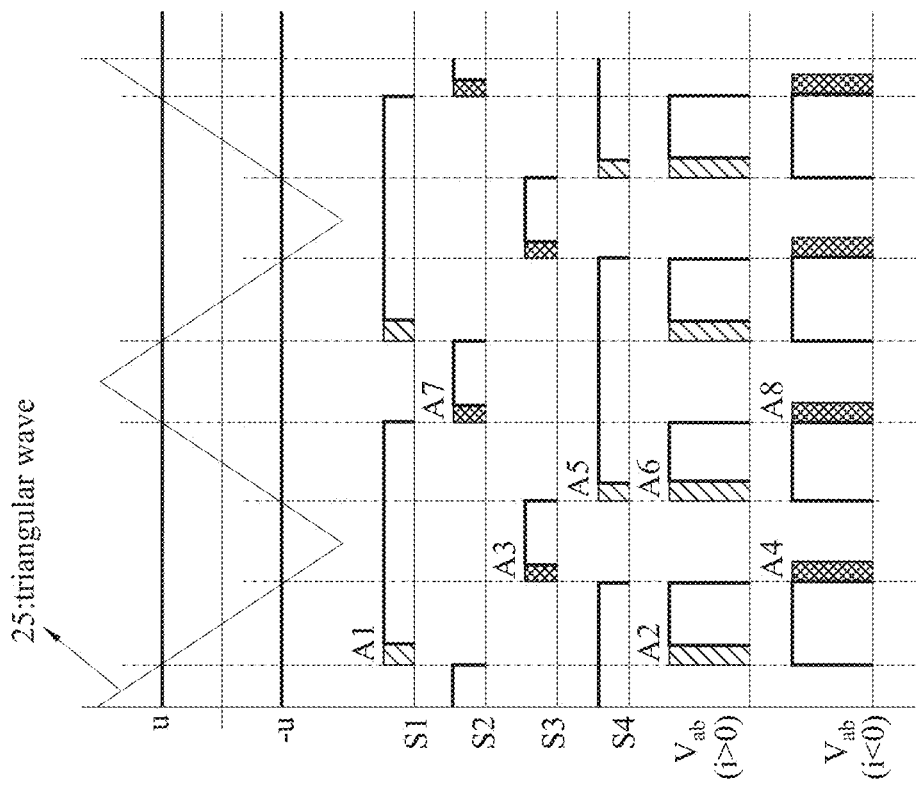
FIG. 4B'
FIG. 4B

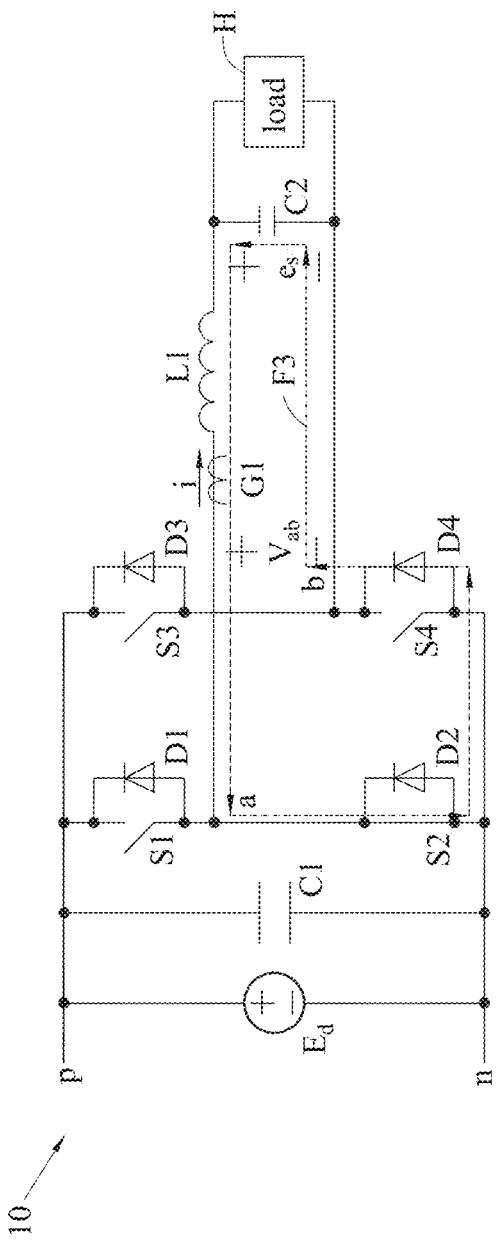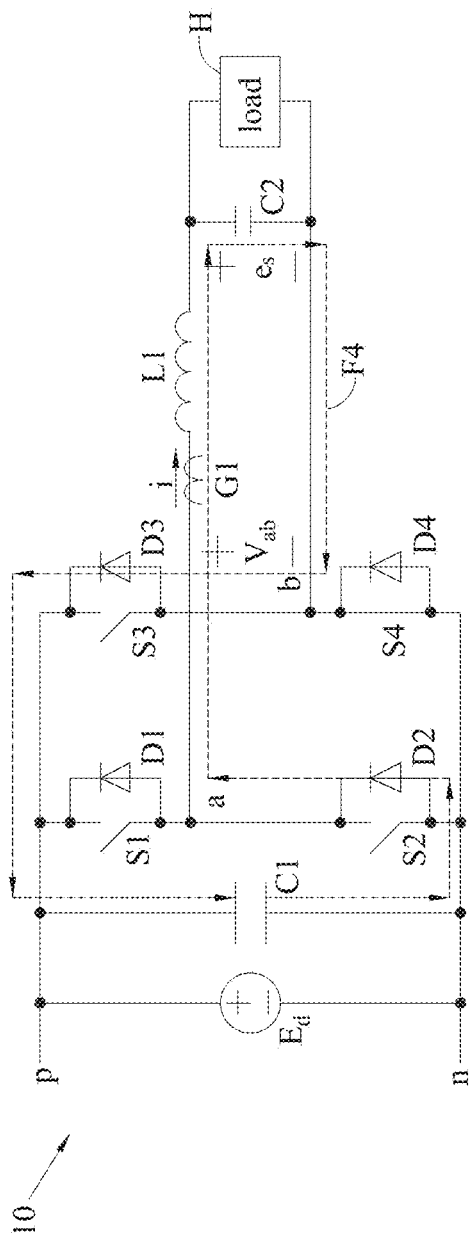
FIG. 5A  FIG. 5A'

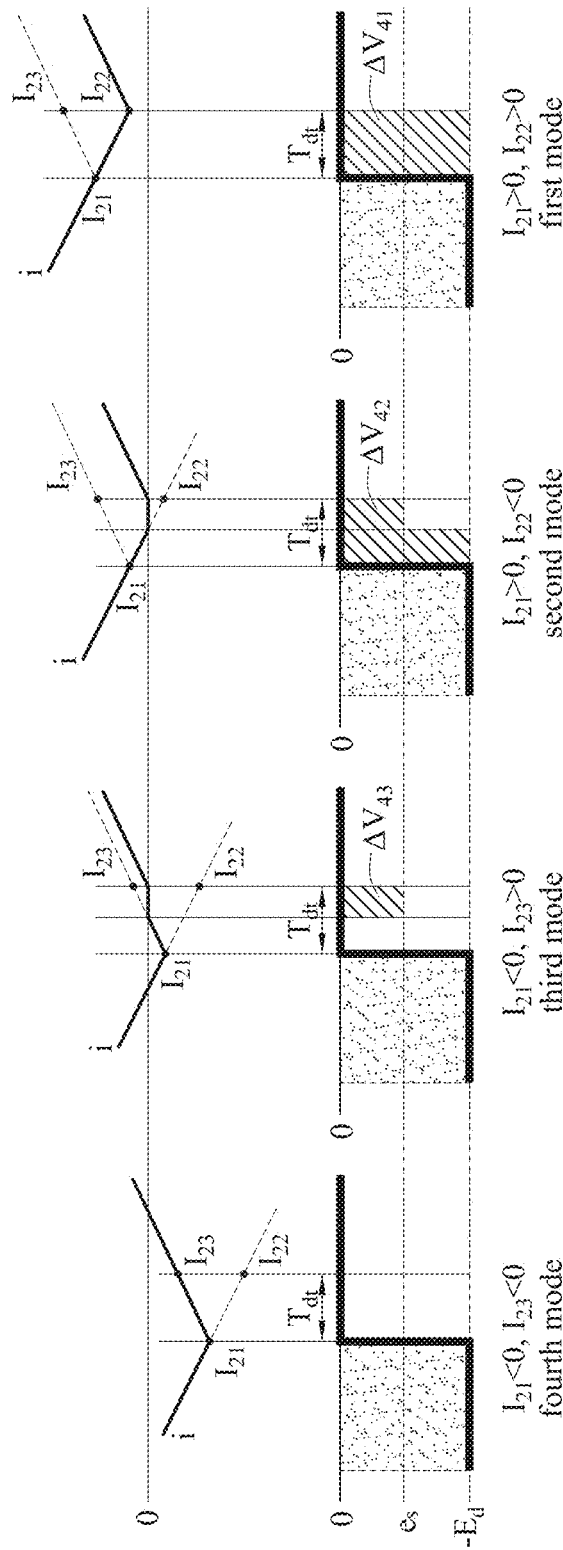

| standard specification | | |
|---|---|---|
| power | | 2.5kW |
| DC voltage at input end | | 400V |
| output voltage (AC) | | 220V$_{rms}$/60Hz |
| performance requirement | total harmonic distortion of output voltage | <3% (linear load) |
| verification result | no compensation (before compensated) | total harmonic distortion of output voltage : 5.18% |
| | the compensation method of the present disclosure (after compensated) | total harmonic distortion of output voltage : 2.01% |

FIG. 11A

DEAD-TIME VOLTAGE COMPENSATION APPARATUS AND DEAD-TIME VOLTAGE COMPENSATION METHOD

CROSS-REFERENCE TO RELATED APPLICATIONS

This application claims priority to Taiwanese Application Serial No. 107136611, filed on Oct. 17, 2018. The entirety of the above-mentioned patent application is hereby incorporated by reference herein and made a part of this specification.

BACKGROUND

1. Technical Field

This disclosure relates to voltage compensation techniques, and, more particularly, to a dead-time voltage compensation apparatus and a dead-time voltage compensation method.

2. Description of Related Art

A semiconductor switching element of a general single-phase DC-AC inverter when receiving a driving signal, will be actuated actually after the lapse of a delay time. There is a delay time between reception of a driving signal and an actual action of switching elements. Such a delay time varies according to different materials or fabrication methods of the semiconductor switching element. The semiconductor switching element has an off delay time longer than an on delay time. In order to prevent the semiconductor switching elements of the upper arm and the lower arm due to the error between the on delay time and the off delay time from short-circuiting the DC input end, a dead-time is added when the semiconductor switching element of the upper arm is off and the semiconductor switching element of the lower arm is on and when the semiconductor switching element of the upper arm is on and the semiconductor switching element of the lower arm is off. The dead-time is determined according to the off delay time of the semiconductor switching elements.

However, although the addition of the dead-time can prevent the DC input end from being short-circuited, the AC voltage of the single-phase DC-AC inverter will loss, such that the total harmonic distortion of the output voltage of the single-phase DC-AC inverter is increased. The performance of the entire system will be affected.

Therefore, how to solve the problems of the prior art is becoming an important issue in the technical field.

SUMMARY

The present disclosure provides a dead-time voltage compensation apparatus and a method thereof, which may calculate a voltage loss due to a dead-time and compensate an AC voltage using a voltage.

In an embodiment, the dead-time voltage compensation apparatus comprises: a single-phase DC-AC inverter having an input end, a first switching module, a second switching module and an inductor, wherein the first switching module and the second switching module convert a DC voltage of the input end into a unipolar AC voltage; and a processor connected to the single-phase DC-AC inverter configured for calculating a first current value, a second current value and a third current value based on a first inductor current value of the inductor, calculating voltage compensation amounts of a first dead-time and a third dead-time of an AC voltage and a second inductor current value of the AC voltage based on polarities of the first current value, the second current value and the third current value, calculating a fourth current value, a fifth current value and a sixth current value based on the second inductor current value, calculating voltage compensation amounts of a second dead-time and a fourth dead-time of the AC voltage based on polarities of the fourth current value, the fifth current value and the sixth current value, and compensating a control reference signal of the processor based on the voltage compensation amount of the first dead-time, the second dead-time, the third dead-time, and the fourth dead-time of the AC voltage.

In another embodiment, the dead-time voltage compensation method comprises: converting a DC voltage of an input end of the single-phase DC-AC inverter into a unipolar AC voltage by using a first switching module and a second switching module of a single-phase DC-AC inverter; calculating, by using a processor, a first current value, a second current value and a third current value based on a first inductor current value of an inductor of the single-phase DC-AC inverter, and calculating a voltage compensation amount of a first dead-time and a third dead-time of the AC voltage and a second inductor current value of the inductor based on polarities of the first current value, the second current value and the third current value; calculating, by using the processor, a fourth current value, a fifth current value and a sixth current value based on the second inductor current value, and calculating voltage compensation amounts of a second dead-time and a fourth dead-time of the AC voltage based on polarities of the fourth current value, the fifth current value and the sixth current value; and compensating, by using the processor, a control reference signal of the processor based on the voltage compensation amount of the first dead-time, the second dead-time, the third dead-time, and the fourth dead-time of the AC voltage.

BRIEF DESCRIPTION OF DRAWINGS

The disclosure can be more fully understood by reading the following detailed descriptions of the embodiments, with reference made to the accompanying drawings, wherein:

FIG. 4A' is a schematic circuit diagram of the single-phase DC-AC inverter operating in the second dead-time according to the present disclosure;

FIG. 4B shows waveform diagrams of the control reference signal, from the first switch element to the fourth switch element, and the AC voltage when the AC voltage of FIGS. 4A to 4A' is positive according to the present disclosure;

FIG. 4B' is a schematic diagram of the control reference signal, the AC voltage and the inductor current when the AC voltage of FIGS. 4A to 4N is positive according to the present disclosure;

FIG. 5A is a schematic circuit diagram of the single-phase DC-AC inverter operating in the third dead-time according to the present disclosure;

FIG. 5A' is a schematic circuit diagram of the single-phase DC-AC inverter operating in the fourth dead-time according to the present disclosure;

FIG. 5B' is a schematic diagram of the control reference signal, the AC voltage and the inductor current when the AC voltage of FIGS. 5A to 5N is negative according to the present disclosure;

FIGS. 9A to 9D are schematic diagrams of the inductor current and the AC voltage in the first mode to the fourth mode of the fourth dead-time according to the present disclosure;

FIG. 11A is a simulated verification specification table of a dead-time voltage compensation apparatus and a dead-time voltage compensation method to an output voltage according to the present disclosure.

DETAILED DESCRIPTION

Figure 1A:
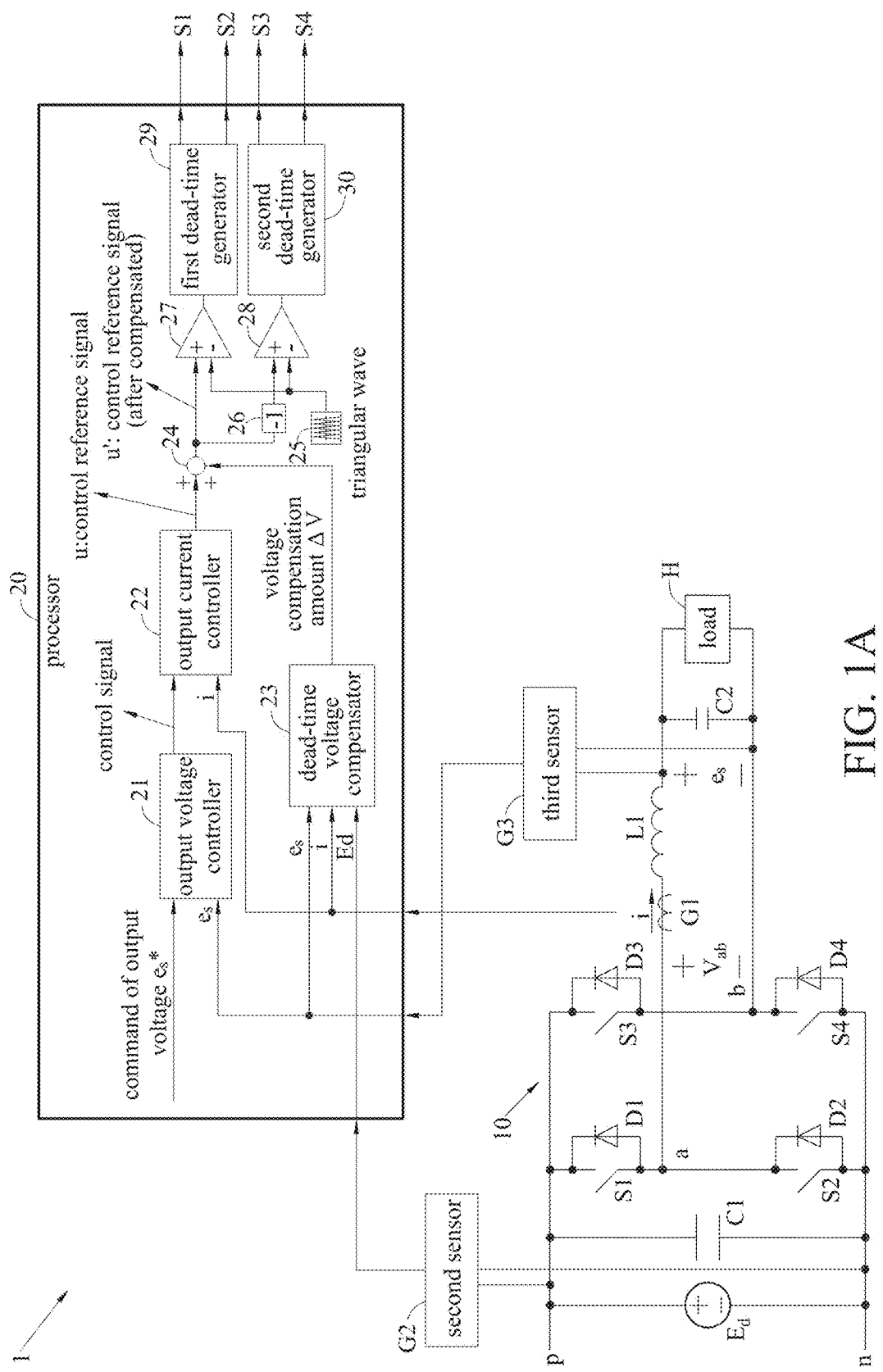
FIG. 1A is a schematic block diagram of a dead-time voltage compensation apparatus according to the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1B:
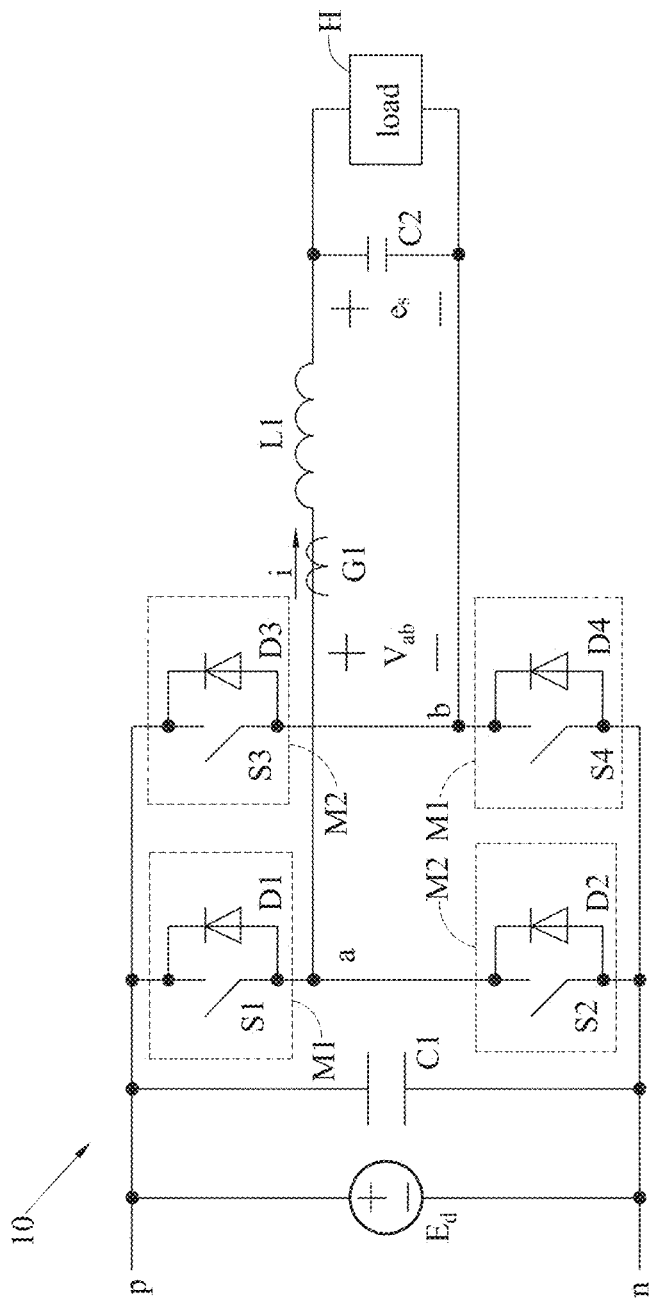
FIG. 1B is a schematic circuit diagram of a single-phase DC-AC inverter of FIG. 1A.

FIG. 1A is a schematic block diagram of a dead-time voltage compensation apparatus 1 according to the present disclosure. FIG. 1B is a schematic circuit diagram of a single-phase DC-AC inverter 10 of the dead-time voltage compensation apparatus 1 according to the present disclosure. The dead-time voltage compensation apparatus 1 may include the single-phase DC-AC inverter 10, a first sensor G1, a second sensor G2, a third sensor G3 and a processor 20. In an embodiment, the single-phase DC-AC inverter 10 may be a single-phase off-grid DC-AC inverter, and the processor 20 may be a controller.

The single-phase DC-AC inverter 10 includes an input end, a first capacitor C1, a first switching module M1, a second switching module M2, an inductor L1, a second capacitor C2 and an output end. The input end has a positive pole p, a negative pole n and a DC voltage $E_d$. The output end has an output voltage $e_s$ and is connected to a load H. The inductor L1 may be a filter inductor.

The first switching module M1 has a first switch element S1 and a first diode D1 in parallel and a fourth switch element S4 and a fourth diode D4 in parallel. The second switching module M2 has a second switch element S2 and a second diode D2 in parallel and a third switch element S3 and a third diode D3 in parallel. By using the first switch element S1 to the fourth switch element S4 of the first switching module M1 and the second switching module M2, the DC voltage $E_d$ at the input end is converted into a AC voltage $V_{ab}$. The AC voltage $V_{ab}$ crosses nodes a and b of FIG. 1A or FIG. 1B. The first switch element S1 to the fourth switch element S4 may be semiconductor switching elements.

The first sensor G1 is connected to the inductor L1 of the single-phase DC-AC inverter for sensing an inductor current i of the inductor L1 (see FIGS. 4B' and 5B'). The second sensor G2 is connected to the input end of the single-phase DC-AC inverter 10 for sensing the DC voltage $E_d$ at the input end. The third sensor G3 is connected to the output end of the single-phase DC-AC inverter 10 for sensing the output voltage $e_s$ at the output end.

The processor 20 is connected to the single-phase DC-AC inverter 10 for calculating a first current value $I_{11}$, a second current value $I_{12}$ and a third current value $I_{13}$ based on a first inductor current value $I_{10}$ of the inductor L1 (see FIGS. 4B' and 5B') and calculating voltage compensation amounts $\Delta V$ of a first dead-time A and a third dead-time C of the AC voltage $V_{ab}$ and a second inductor current value $I_{20}$ of the inductor L1 based on polarities of the first current value $I_{11}$, the second current value $I_{12}$ and the third current value $I_{13}$ (e.g., a positive pole indicating a current value greater than zero, and a negative pole indicating a current value less than zero). The processor 20 also calculates a fourth current value $I_{21}$, a fifth current value $I_{22}$ and a sixth current value $I_{23}$ (see FIGS. 4B' and 5B') based on the second inductor current value $I_{20}$, and calculates voltage compensation amounts $\Delta V$ of a second dead-time B and a fourth dead-time D of the AC voltage $V_{ab}$ based on polarities of the fourth current value $I_{21}$, the fifth current value $I_{22}$ and the sixth current value $I_{23}$ (e.g., a positive pole indicating a current value greater than zero; and a negative pole indicating a current value less than zero). The processor 20 further compensates a control reference signal u of the processor 20 based on the voltage compensation amounts $\Delta V$ of the first dead-time A, the second dead-time B, the third dead-time C and the fourth dead-time D of the AC voltage $V_{ab}$.

In an embodiment, the processor 20 includes an output voltage controller 21, an output current controller 22, a dead-time voltage compensator 23, an adder 24, a triangular wave generator 25, an inverter 26, a first comparator 27, a second comparator 28, a first dead-time generator 29 and a second dead-time generator 30, which can be constituted by software, hardware or a combination thereof.

The output voltage controller 21 generates the control signal based on the output voltage $e_s$ from the single-phase DC-AC inverter 10 (the third sensor G3) and the command $e_s^*$ (command of the output voltage) corresponding to the output voltage $e_s$. The output current controller 22 generates the control reference signal u shown in FIG. 2 based on the control signal from the output voltage controller 21 and the inductor current i of the inductor L1 of the single-phase DC-AC inverter 10 (the inductor current i is measured by the first sensor G1).

Figure 2:
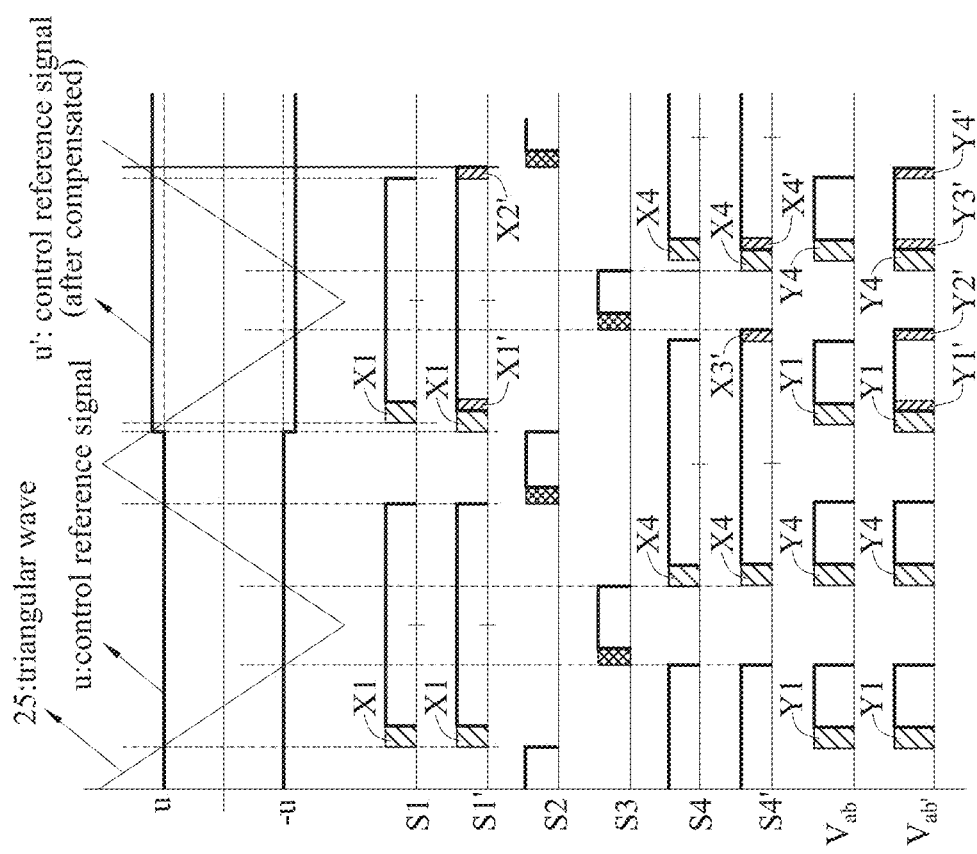
FIG. 2 shows waveform diagrams of a control reference signal, from a first switch element to a fourth switch element, and an AC voltage in the dead-time voltage compensation apparatus of FIG. 1A.

The dead-time voltage compensator 23 generates a voltage compensation amount $\Delta V$ based on the inductor current i of the inductor L1 of the single-phase DC-AC inverter 10 (measured by the first sensor G1), the DC voltage $E_d$ from the single-phase DC-AC inverter 10 (measured by the second sensor G2) and the output voltage $e_s$ from the single-phase DC-AC inverter 10 (measured by the third sensor G3). The adder 24 generates a compensated control reference signal u' based on the control reference signal u from the output current controller 22 and the voltage compensation amount $\Delta V$ from the dead-time voltage compensator 23. The triangular wave generator 25 generates a triangular wave, as shown in FIG. 2. The inverter 26 changes the compensated control reference signal u' to an inverted compensated control reference signal −u'.

The first comparator 27 compares positions of the compensated control reference signal u' and the triangular wave. And then the first dead-time generator 29 generates and provides a dead-time to switching signals of a first switch element S1 and a second switch element S2 of the single-phase DC-AC inverter 10 based on the positions between the compensated control reference signal u' and the triangular wave relatively. The second comparator 28 compares positions of the inverted compensated control reference signal −u' and the triangular wave. And then the second dead-time generator 30 generates and provides a dead-time to switching signals of a third switch element S3 and a fourth switch element S4 of the single-phase DC-AC inverter 10 based on the positions between the inverted compensated control reference signal −u' and the triangular wave relatively.

FIG. 2 is a waveform diagram of the control reference signal u, from the first switch element S1 to the fourth switch element S4 and the AC voltage $V_{ab}$ in the dead-time voltage compensation apparatus 1 of FIGS. 1A and 1B. As shown in FIG. 2, the left half shows the control reference signal u before being compensated (i.e., uncompensated), and the right half shows the compensated control reference signal u'. A half cycle of a sine wave is provided as an example. The width of a pulse of the AC voltage $V_{ab}$ is determined by widths of pulses of the first switch element S1 and the fourth switch element S4. The width of a pulse of the compensated AC voltage $V_{ab'}$ is determined by the widths of pulses of the compensated first switch element S1' and the compensated fourth switch element S4' after being compensated.

In an embodiment, the voltage losses of the AC voltage $V_{ab}$ due to the first dead-time A are the pulse Y1 and the pulse Y4, respectively, and the pulse Y1 and the pulse Y4 of the AC voltage $V_{ab}$ correspond to the pulse X1 of the first switch element S1 and the pulse X4 of the fourth switch element S4, respectively. The voltage compensation amount $\Delta V$ is compensated to the control reference signal u and then the compensated control reference signal u' is generated. The control reference signal u' is modulated to generate signals of the compensated first switch element S1' and the compensated fourth switch element S4'. The single-phase DC-AC inverter 10 outputs the compensated AC voltage $V_{ab'}$. The additional components of the compensated AC voltage $V_{ab'}$ are pulses Y1', Y2', Y3' and Y4'. The pulse X1' of the compensated first switch element S1' corresponds to the pulse Y1' of the compensated AC voltage $V_{ab'}$. The pulse X3' of the compensated fourth switch element S4' corresponds to the pulse Y2' of the compensated AC voltage $V_{ab'}$. The pulse X4' of the compensated fourth switch element S4' corresponds to the pulse Y3' of the compensated AC voltage $V_{ab'}$. The pulse X2' of the compensated first switch element S1' corresponds to the pulse Y4' of the compensated AC voltage $V_{ab'}$. As a whole, the single-phase DC-AC inverter 10 converts a DC voltage into a unipolar AC voltage. The AC voltage $V_{ab}$ and the compensated AC voltage $V_{ab'}$ are also regarded as unipolar AC voltages.

Figure 3:
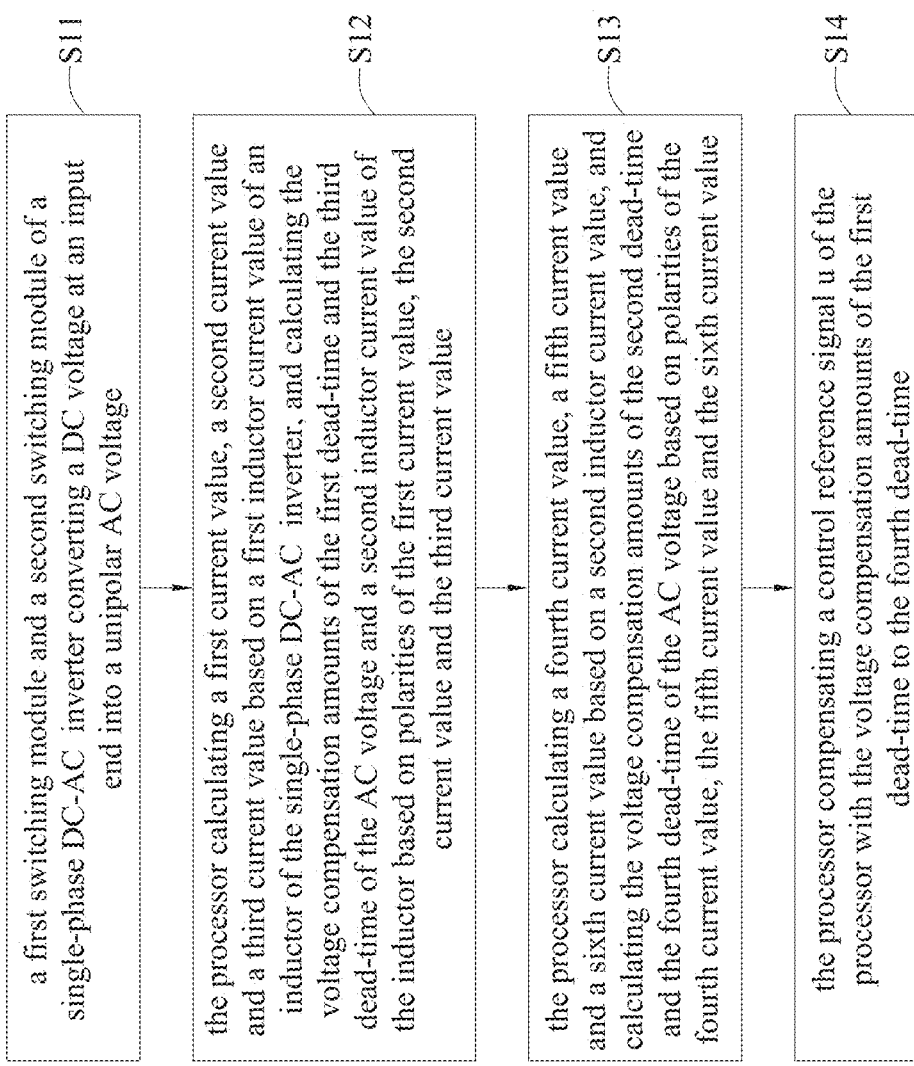
FIG. 3 is a flow chart of a dead-time voltage compensation method according to the present disclosure.

FIG. 3 is a flow chart of a dead-time voltage compensation method according to the present disclosure. Please also refer to FIGS. 1A and 1B. The primary techniques of FIG. 3 are described as follows, and the remaining techniques of FIG. 3 are the same as those described in FIGS. 1A and 1B, and not repeated hereby.

In step S11 of FIG. 3, a first switching module M1 and a second switching module M2 of a single-phase DC-AC inverter 10 convert a DC voltage $E_d$ at an input end into an AC voltage $V_{ab}$. As a whole, the single-phase DC-AC inverter 10 converts a DC voltage into a unipolar AC voltage. The AC voltage $V_{ab}$ is also regarded as a unipolar AC voltage.

In step S12 of FIG. 3, the processor 20 calculates a first current value $I_{11}$, a second current value $I_{12}$ and a third current value $I_{13}$ based on a first inductor current value $I_{10}$ of an inductor L1 of the single-phase DC-AC inverter 10 (see FIGS. 4B' and 5B'), and calculates the voltage compensation amounts $\Delta V$ of the first dead-time A and the third dead-time C of the AC voltage $V_{ab}$ and a second inductor current value $I_{20}$ of the inductor L1 based on polarities of the first current value $I_{11}$, the second current value $I_{12}$ and the third current value $I_{13}$ (e.g., a positive pole indicating a current value greater than zero; and a negative pole indicating a current value less than zero).

In step S13 of FIG. 3, the processor 20 calculates a fourth current value $I_{21}$, a fifth current value $I_{22}$ and a sixth current value $I_{23}$ based on a second inductor current value $I_{20}$, and calculates the voltage compensation amounts $\Delta V$ of the second dead-time B and the fourth dead-time D of the AC voltage $V_{ab}$ based on polarities of the fourth current value $I_{21}$, the fifth current value $I_{22}$ and the sixth current value $I_{23}$ (e.g., a positive pole indicating a current value greater than zero; and a negative pole indicating a current value less than zero).

In step S14 of FIG. 3, the processor 20 compensates a control reference signal u of the processor 20 using the voltage compensation amounts $\Delta V$ of the first dead-time A to the fourth dead-time D.

Figure 4A:
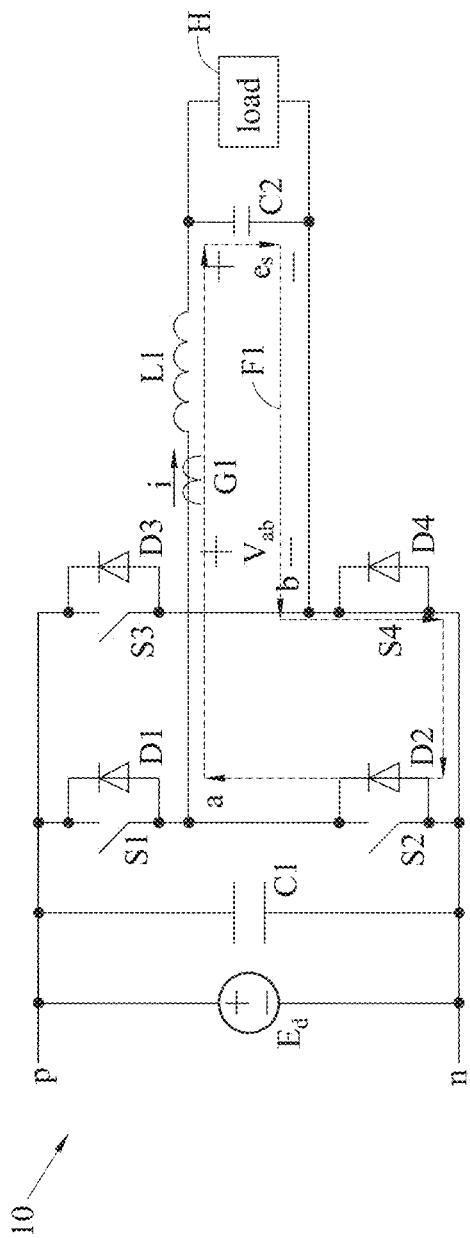
FIG. 4A is a schematic circuit diagram of a single-phase DC-AC inverter operating in a first dead-time according to the present disclosure.
Figure 4A:
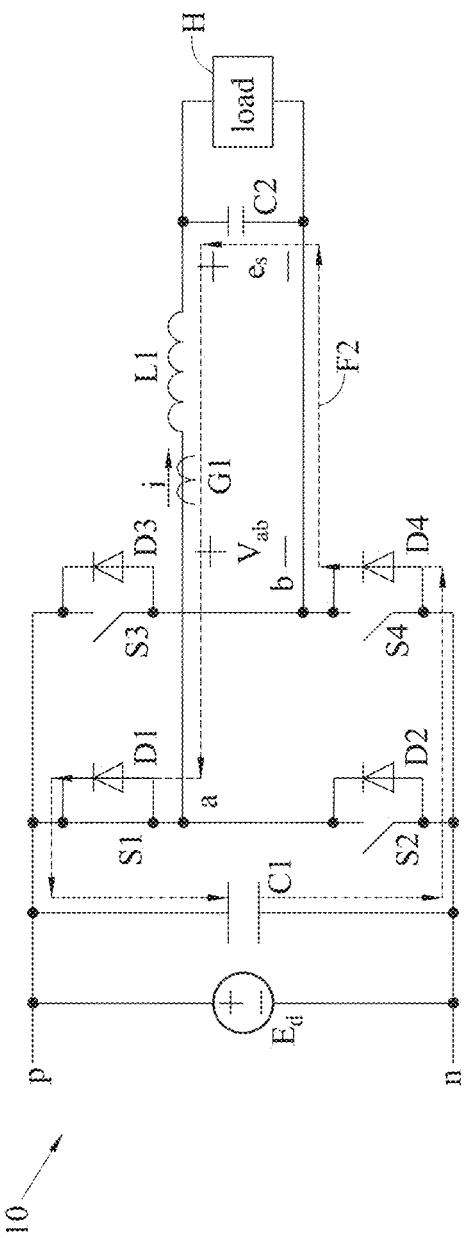

FIG. 4A is a schematic circuit diagram of the single-phase DC-AC inverter 10 operating in the first dead-time A according to the present disclosure. FIG. 4A' is a schematic circuit diagram of the single-phase DC-AC inverter 10 operating in the second dead-time B according to the present disclosure. FIG. 4B is a waveform diagram of the control reference signal u, from the first switch element S1 to the fourth switch element S4 and the AC voltage $V_{ab}$ when the output voltage $e_s$ of FIGS. 4A to 4A' is positive (i.e., $e_s$>0). The delay actuation of the first switch element S1 of FIG. 4B results in the pulse A1, and the pulse A1 results in the pulse A2 of the AC voltage $V_{ab}$, which is an insufficient pulse width. The delay actuation of the third switch element S3 results in the pulse A3, and the pulse A3 results in the pulse A4 of the AC voltage $V_{ab}$, which is a redundant pulse width. The delay actuation of the fourth switch element S4 results in the pulse A5, and the pulse A5 results in the pulse A6 of the AC voltage $V_{ab}$, which is an insufficient pulse width. The delay actuation of the second switch element S2 results in the pulse A7, and the pulse A7 results in the pulse A8 of the AC voltage $V_{ab}$, which is a redundant pulse width. The pulse A2 and the pulse A6 constitute the first dead-time A of FIG. 4B'. The pulse A4 and the pulse A8 constitute the second dead-time B of FIG. 4B'. FIG. 4B' is a waveform diagram of the control reference signal u, the AC voltage $V_{ab}$ and the current i (the inductor current) when the output voltage $e_s$ of FIGS. 4A to 4N is positive.

As shown in FIG. 4A and FIGS. 4B to 4B', when the single-phase DC-AC inverter 10 operates in the first dead-time A, the first switch element S1 to the third switch element S3 are all off, the fourth switch element S4 is on, the output voltage $e_s$ is positive (i.e., $e_s>0$), the current i (the inductor current) is positive (i.e., i>0), the current i flows through the inductor L1, the second capacitor C2, the fourth switch element S4 and the second diode D2 sequentially, and a first current loop F1 is thus constituted.

As shown in FIG. 4N and FIGS. 4B to 4B', when the single-phase DC-AC inverter 10 operates in the second dead-time B, the second switch element S2 to the fourth switch element S4 are all off, the first switch element S1 is on, the output voltage $e_s$ is positive, the current i (the inductor current) is negative (i.e., i<0), the current i flows through the first diode D1, the first capacitor C1, the fourth diode D4, the second capacitor C2 and the inductor L1 sequentially, and a second current loop F2 is thus constituted.

Figure 5B:
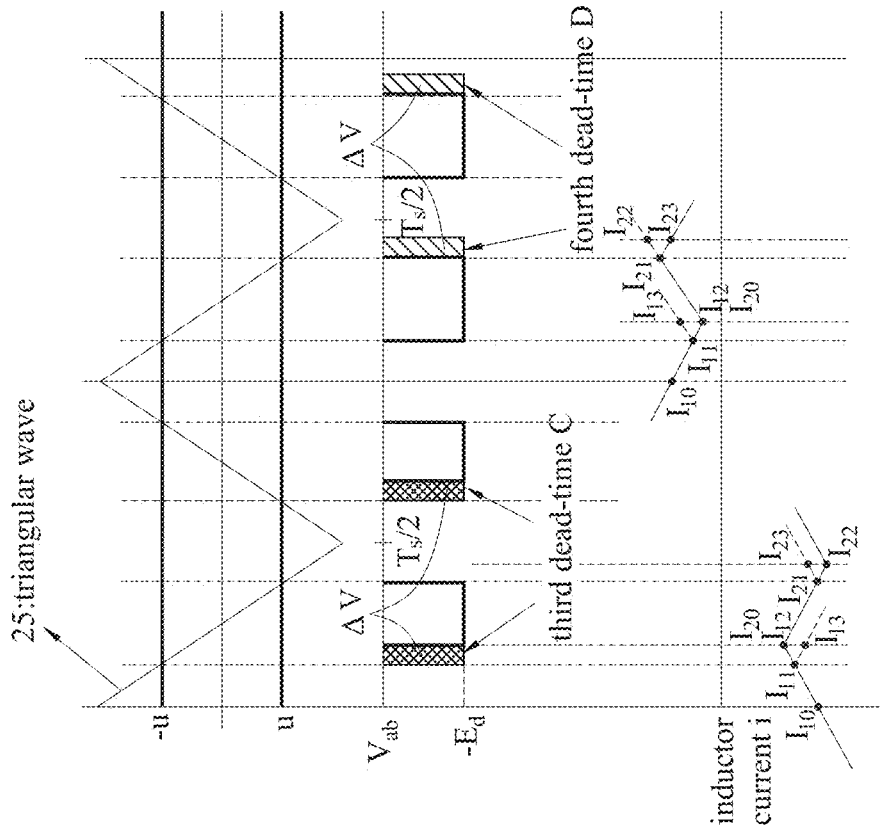
FIG. 5B shows waveform diagrams of the control reference signal, from the first switch element to the fourth switch element, and the AC voltage when the AC voltage of FIGS. 5A to 5A' is negative according to the present disclosure.
Figure 5B:
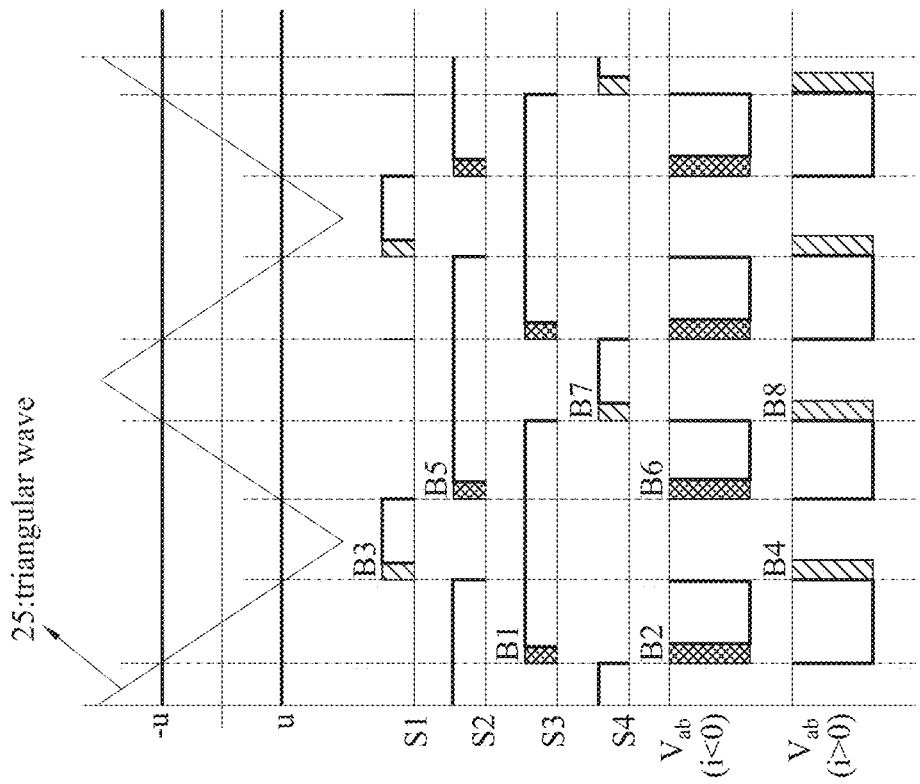

FIG. 5A is a schematic circuit diagram of the single-phase DC-AC inverter 10 operating in the third dead-time C according to the present disclosure. FIG. 5A' is a schematic circuit diagram of the single-phase DC-AC inverter 10 operating in the fourth dead-time D according to the present disclosure. FIG. 5B is a waveform diagram of the control reference signal u, from the first switch element S1 to the fourth switch element S4 and the AC voltage $V_{ab}$ when the output voltage $e_s$ of FIGS. 5A to 5A' is negative (i.e., $e_s<0$). The delay actuation of the third switch element S3 of FIG. 5B results in the pulse B1, and the pulse B1 results in the pulse B2 of the AC voltage $V_{ab}$, which is an insufficient pulse width. The delay actuation of the first switch element S1 results in the pulse B3, and the pulse B3 results in the pulse B4 of the AC voltage $V_{ab}$, which is a redundant pulse width. The delay actuation of the second switch element S2 results in the pulse B5, and the pulse B5 results in the pulse B6 of the AC voltage $V_{ab}$, which is an insufficient pulse width. The delay actuation of the fourth switch element S4 results in the pulse B7, and the pulse B7 results in the pulse B8 of the AC voltage $V_{ab}$, which is a redundant pulse width. The pulse B2 and the pulse B6 constitute the third dead-time C of FIG. 5B'. The pulse B4 and the pulse B8 constitute the fourth dead-time D of FIG. 5B'. FIG. 5B' is a waveform diagram of the control reference signal u, the AC voltage $V_{ab}$ and the current i (the inductor current) when the output voltage $e_s$ of FIGS. 5A to 5A' is negative.

As shown in FIG. 5A and FIGS. 5B to 5B', when the single-phase DC-AC inverter 10 operates in the third dead-time C, the first switch element S1, the third switch element S3 and the fourth switch element S4 are all off, the second switch element S2 is on, the output voltage $e_s$ is negative (i.e., $e_s<0$), the current i (the inductor current) is negative (i.e., i<0), the current i flows through the second switch element S2, the fourth diode D4, the second capacitor C2 and the inductor L1 sequentially, and a third current loop F3 is thus constituted.

As shown in FIG. 5N and FIGS. 5B to 5B', when the single-phase DC-AC inverter 10 operates in the fourth dead-time D, the first switch element S1 to the third switch element S3 are all off, the fourth switch element S4 is on, the output voltage $e_s$ is negative (i.e., $e_s<0$), the current i (the inductor current) is positive (i.e., i>0), the current i flows through the inductor L1, the second capacitor C2, the third diode D3, the first capacitor C1 and the second diode D2 sequentially, and a fourth current loop F4 is thus constituted.

Figures 6A, 6B, 6C, 6D:
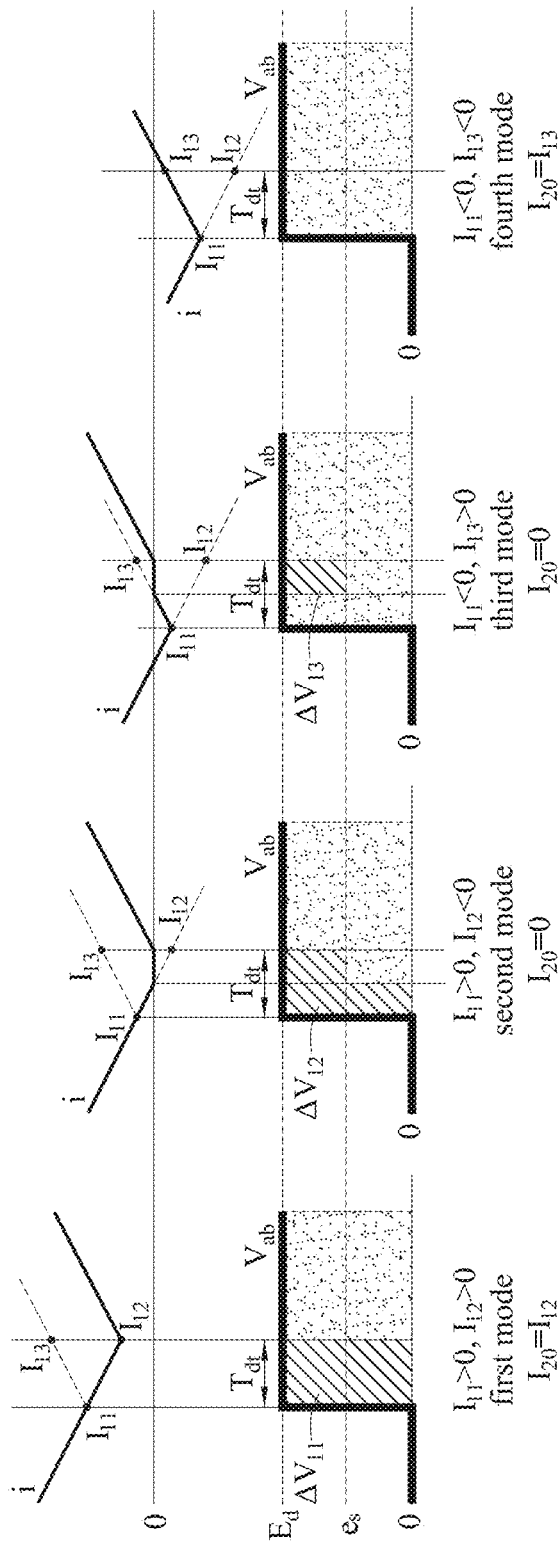
FIGS. 6A to 6D are schematic diagrams of the inductor current and the AC voltage in the first mode to the fourth mode of the first dead-time according to the present disclosure.

FIGS. 6A to 6D are schematic diagrams of the inductor current i and the AC voltage $V_{ab}$ in the first mode to the fourth mode of the first dead-time A according to the present disclosure. As shown in FIG. 6A, the first mode is the first dead-time A before the switching element is on, and the first dead-time A will result in the voltage loss of the AC voltage $V_{ab}$ and the voltage shall be compensated completely. As shown in FIGS. 6B and 6C, the current i of the second mode and the third mode passes through the zero point, and such a phenomenon results in a partial voltage loss of the AC voltage $V_{ab}$ and the voltage shall be compensated partially. As shown in FIG. 6D, the fourth mode indicates that the switching element is on completely, and the AC voltage $V_{ab}$ has no voltage loss and voltage compensation is not needed. In FIGS. 6A to 6D, a slanted-line region indicates the voltage loss of the AC voltage $V_{ab}$ due to the first dead-time A, and the control reference signal u of the processor is needed to be compensated using corresponding voltage compensation amounts ΔV.

As shown in FIGS. 6A to 6D, the inductor current i is an actually measured value, and the first current value $I_{11}$, the second current value $I_{12}$ and the third current value $I_{13}$ are calculated values. When the first current value $I_{11}$ is greater than zero and the second current value $I_{12}$ is greater than zero, the first dead-time A is in the first mode (see FIG. 6A). When the first current value $I_{11}$ is greater than zero and the second current value $I_{12}$ is less than zero, the first dead-time A is in the second mode (see FIG. 6B). When the first current value $I_{11}$ is less than zero and the third current value $I_{13}$ is greater than zero, the first dead-time A is in the third mode (see FIG. 6C). When the first current value $I_{11}$ is less than zero and the third current value $I_{13}$ is less than zero, the first dead-time A is in the fourth mode (see FIG. 6D).

When being in the first dead-time A of the AC voltage $V_{ab}$, the processor 20 calculates the first current value $I_{11}$, the second current value $I_{12}$ and the third current value $I_{13}$ according to current value algorithms (1), (2) and (3) below, respectively:

$$I_{11} = I_{10} - \frac{e_s}{L} \times \frac{(1-|u|)T_s}{4}, \tag{1}$$

$$I_{12} = I_{11} - \frac{e_s}{L} \times T_{dt}, \text{ and} \tag{2}$$

$$I_{13} = I_{11} - \frac{e_s - E_d}{L} \times T_{dt}, \tag{3}$$

wherein ho is the first inductor current value (measured from the inductor L1), $I_{11}$ is the first current value, $I_{12}$ is the second current value, $I_{13}$ is the third current value (a calculated value), $E_d$ is the DC voltage at the input end, $e_s$ is the output voltage of the single-phase DC-AC inverter 10, L is the inductance value of the inductor L1, $T_{dt}$ is the dead-time value of the first dead-time generator 29 and the second dead-time generator 30, $T_s$ is the switch-switching period of the single-phase DC-AC inverter 10, and u is the control reference signal of the processor 20.

FIG. 6A shows that in the first mode of the first dead-time A the processor 20 calculates the voltage compensation amounts $\Delta V_{11}$ of the control signal u according to a voltage compensation amount algorithm (4) below:

$$\Delta V_{11} = -E_d \frac{2T_{dt}}{T_s}. \quad (4)$$

FIG. 6B shows that in the second mode of the first dead-time A, the processor 20 calculates the voltage compensation amounts $\Delta V_{12}$ of the control signal u according to a voltage compensation amount algorithm (5) below:

$$\Delta V_{12} = -\frac{E_d|I_{11}| + (E_d - e_s)|I_{12}|}{|I_{11}| + |I_{12}|} \frac{2T_{dt}}{T_s}. \quad (5)$$

FIG. 6C shows that in the third mode of the first dead-time A, the processor 20 calculates the voltage compensation amounts $\Delta V_{13}$ of the control signal u according to a voltage compensation amount algorithm (6) below:

$$\Delta V_{13} = -\frac{(E_d - e_s)|I_{13}|}{|I_{11}| + |I_{13}|} \frac{2T_{dt}}{T_s}. \quad (6)$$

In the voltage compensation amount algorithms (4) to (6), the voltage compensation amounts $\Delta V_{11}$, $\Delta V_{12}$ and $\Delta V_{13}$ are voltage compensation amounts for the control reference signal u when being in the first mode, the second mode and the third mode of the first dead-time A, respectively. $E_d$ is the DC voltage at the input end, $e_s$ is the output voltage of the single-phase DC-AC inverter 10, $I_{11}$ is the first current value, $I_{12}$ is the second current value, $I_{13}$ is the third current value, $T_{dt}$ is the dead-time value of the first dead-time generator 29 and the second dead-time generator 30, and $T_s$ is the switch-switching period of the single-phase DC-AC inverter 10. After the voltage compensation amounts $\Delta V_{11}$, $\Delta V_{12}$ or $\Delta V_{13}$ is compensated to the control reference signal u, the compensated control reference signal u' is generated. The compensated control reference signal u' and the triangular wave 25 are compared, and the signals of the compensated first switch element S1' to the compensated fourth switch element S4' are generated. The single-phase DC-AC inverter 10 outputs the compensated AC voltage $V_{ab'}$, thereby reducing of the effect of the first dead-time A on the AC voltage $V_{ab}$.

FIG. 6D shows that in the fourth mode of the first dead-time A, the AC voltage $V_{ab}$ has no voltage loss, and voltage compensation is not needed.

FIGS. 7A to 7D are schematic diagrams of the inductor current i and the AC voltage $V_{ab}$ in the first mode to the fourth mode of the second dead-time B. When the fourth current value $I_{21}$ is less than zero and the fifth current value $I_{22}$ is less than zero, the second dead-time B is in the first mode (see FIG. 7D). When the fourth current value $I_{21}$ is less than zero and the fifth current value $I_{22}$ is greater than zero, the second dead-time B is in the second mode (see FIG. 7C). When the fourth current value $I_{21}$ is greater than zero and the sixth current value $I_{23}$ is less than zero, the second dead-time B is in the third mode (see FIG. 7B). When the fourth current value $I_{21}$ is greater than zero and the sixth current value $I_{23}$ is greater than zero, the second dead-time B is in the fourth mode (see FIG. 7A).

When in the second dead-time B of the AC voltage $V_{ab}$, the processor 20 calculates the fourth current value $I_{21}$, the fifth current value $I_{22}$ and the sixth current value $I_{23}$ according to current value algorithms (7), (8) and (9) below, respectively:

$$I_{21} = I_{20} - \frac{e_s - E_d}{L} \times \left(\frac{|u|T_s}{2} - T_{dt}\right), \quad (7)$$

$$I_{22} = I_{21} - \frac{e_s - E_d}{L} \times T_{dt}, \text{ and} \quad (8)$$

$$I_{23} = I_{21} - \frac{e_s}{L} \times T_{dt}, \quad (9)$$

wherein $I_{20}$ is the second inductor current value, $I_{21}$ is the fourth current value, $I_{22}$ is the fifth current value, $I_{23}$ is the sixth current value, $E_d$ is the DC voltage at the input end, $e_s$ is the output voltage of the single-phase DC-AC inverter 10, L is the inductance value of the inductor L1, $T_{dt}$ is the dead-time value of the first dead-time generator 29 and the second dead-time generator 30, $T_s$ is the switch-switching period of the single-phase DC-AC inverter 10, and u is the control reference signal of the processor 20.

Figures 7A, 7B, 7C, 7D:
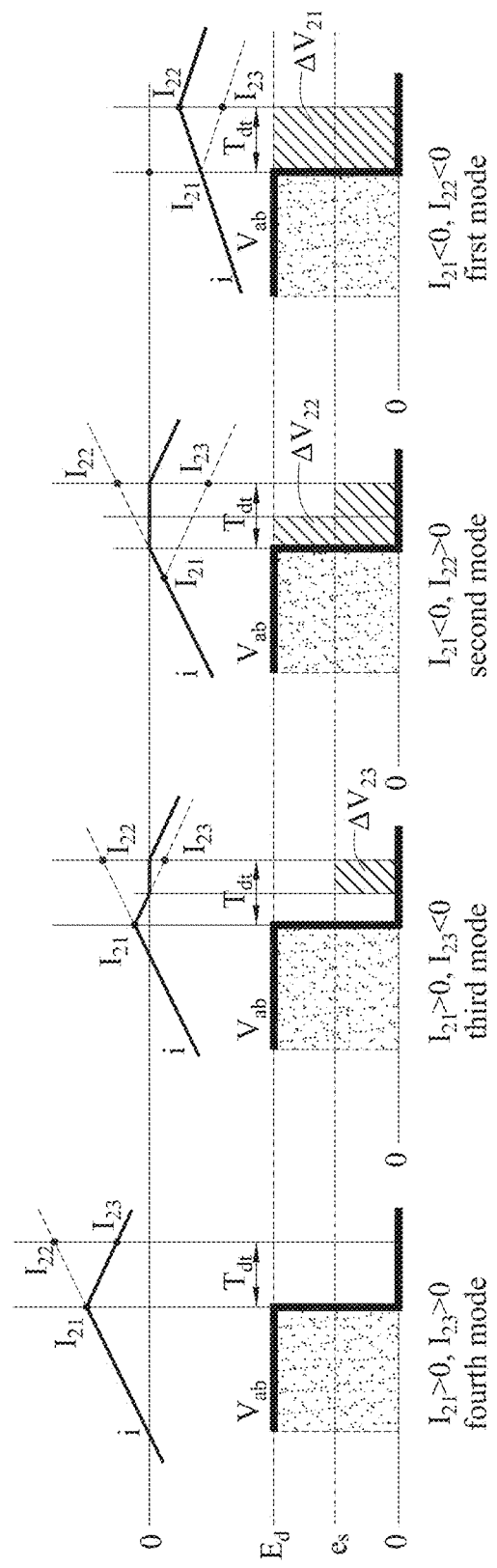
FIGS. 7A to 7D are schematic diagrams of the inductor current and the AC voltage in the first mode to the fourth mode of the second dead-time according to the present disclosure.

FIG. 7D shows that in the first mode of the second dead-time B, the processor 20 calculates the voltage compensation amounts $\Delta V_{21}$ of the control reference signal u according to a voltage compensation amount algorithm (10) below:

$$\Delta V_{21} = E_d \frac{2T_{dt}}{T_s}. \quad (10)$$

FIG. 7C shows that in the second mode of the second dead-time B, the processor 20 calculates the voltage compensation amounts $\Delta V_{22}$ of the control reference signal u according to a voltage compensation amount algorithm (11) below:

$$\Delta V_{22} = \frac{E_d|I_{21}| + e_s|I_{22}|}{|I_{21}| + |I_{22}|} \frac{2T_{dt}}{T_s}. \quad (11)$$

FIG. 7B shows that in the third mode of the second dead-time B, the processor 20 calculates the voltage compensation amounts $\Delta V_{23}$ of the control reference signal u according to a voltage compensation amount algorithm (12) below:

$$\Delta V_{23} = \frac{e_s|I_{23}|}{|I_{21}| + |I_{23}|} \frac{2T_{dt}}{T_s}. \quad (12)$$

In the voltage compensation amount algorithms (10) to (12), the voltage compensation amounts $\Delta V_{21}$, $\Delta V_{22}$ and $\Delta V_{23}$ are the voltage compensation amounts for the control reference signal u when in the first mode, the second mode and the third mode of the second dead-time B, respectively, $E_d$ is the DC voltage at the input end, $e_s$ is the output voltage of the single-phase DC-AC inverter 10, $I_{21}$ is the fourth current value, $I_{22}$ is the fifth current value, $I_{23}$ is the sixth current value, $T_{dt}$ is the dead-time value of the first dead-time generator 29 and the second dead-time generator 30, and $T_s$ is the switch-switching period of the single-phase DC-AC inverter 10. After the control reference signal u is compensated using the voltage compensation amounts $\Delta V_{21}$, $\Delta V_{22}$ or $\Delta V_{23}$, the compensated control reference signal u' is generated. The control reference signal u' and the triangular wave 25 are compared, and the signals of the compensated first switch element S1' to the compensated fourth switch element S4' are generated. The single-phase DC-AC inverter 10 outputs the compensated AC voltage $V_{ab'}$, thereby reducing the effect of the second dead-time B on the AC voltage $V_{ab}$.

FIG. 7A shows that in the fourth mode of the second dead-time B, the AC voltage $V_{ab}$ has no voltage loss, and voltage compensation is not needed.

FIGS. 8A to 8D are schematic diagrams of the inductor current i and the AC voltage $V_{ab}$ in the first mode to the fourth mode of the third dead-time C. When the first current value $I_{11}$ is less than zero and the second current value $I_{12}$ is less than zero, the third dead-time C is in the first mode (see FIG. 8A). When the first current value $I_{11}$ is less than zero and the second current value $I_{12}$ is greater than zero, the third dead-time C is in the second mode (see FIG. 8B). When the first current value $I_{11}$ is greater than zero, and the third current value $I_{13}$ is less than zero, the third dead-time C is in the third mode (see FIG. 8C). When the first current value $I_{11}$ is greater than zero, and the third current value $I_{13}$ is greater than zero, the third dead-time C is in the fourth mode (see FIG. 8D).

When in the third dead-time C of the AC voltage $V_{ab}$, the processor 20 calculates the first current value $I_{11}$, the second current value $I_{12}$ and the third current value $I_{13}$ according to current value algorithms (13) to (15) below, respectively:

$$I_{11} = I_{10} - \frac{e_s}{L} \times \frac{(1-|u|)T_s}{4}, \tag{13}$$

$$I_{12} = I_{11} - \frac{e_s}{L} \times T_{dt}, \text{ and} \tag{14}$$

$$I_{13} = I_{11} - \frac{e_s + E_d}{L} \times T_{dt}, \tag{15}$$

wherein $I_{10}$ is the first inductor current value, $I_{11}$ is the first current value, $I_{12}$ is the second current value, $I_{13}$ is the third current value, $E_d$ is the DC voltage at the input end, $e_s$ is the output voltage of the single-phase DC-AC inverter 10, L is the inductance value of the inductor L1, $T_{dt}$ is the dead-time value of the first dead-time generator 29 and the second dead-time generator 30, $T_s$ is the switch-switching period of the single-phase DC-AC inverter 10, and u is the control reference signal of the processor 20.

Figures 8A, 8B, 8C, 8D:
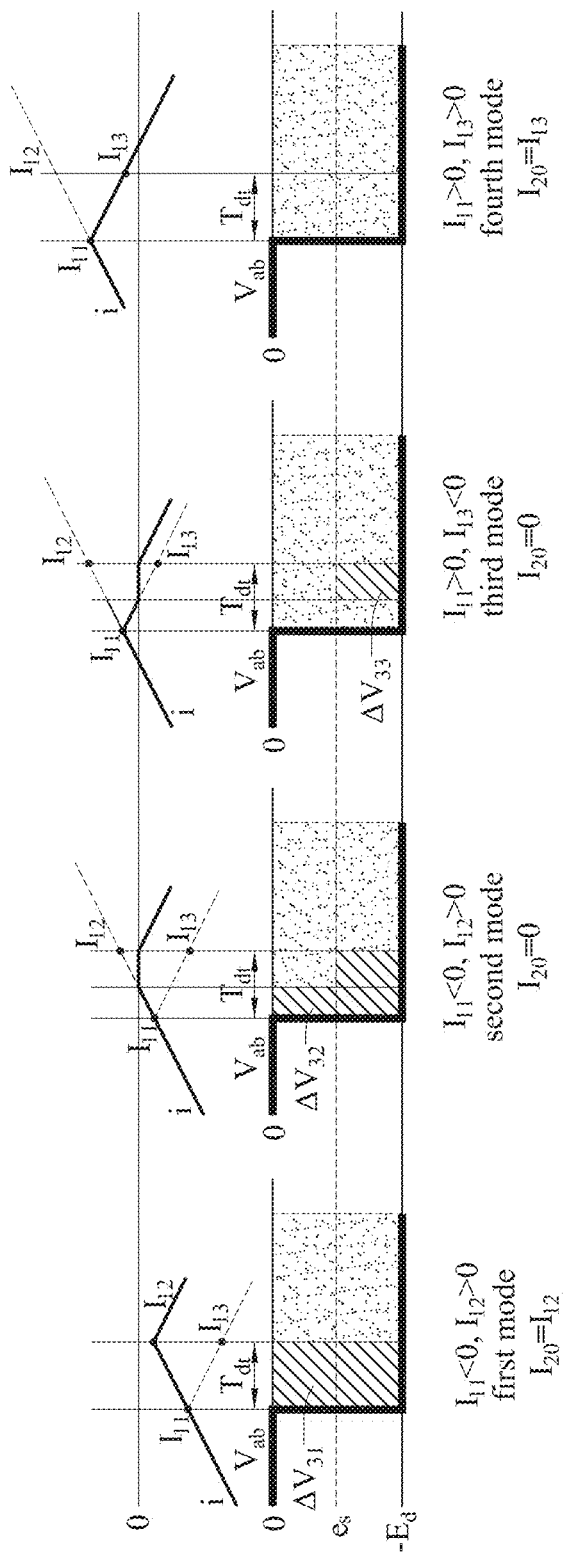
FIGS. 8A to 8D are schematic diagrams of the inductor current and the AC voltage in the first mode to the fourth mode of the third dead-time according to the present disclosure.

FIG. 8A shows that in the first mode of the third dead-time C, the processor 20 calculates the voltage compensation amounts $\Delta V_{31}$ of the control reference signal u according to a voltage compensation amount algorithm (16) below:

$$\Delta V_{31} = E_d \frac{2T_{dt}}{T_s}. \tag{16}$$

FIG. 8B shows that in the second mode of the third dead-time C, the processor 20 calculates the voltage compensation amounts $\Delta V_{32}$ of the control reference signal u according to a voltage compensation amount algorithm (17) below:

$$\Delta V_{32} = \frac{E_d|I_{11}| + (E_d + e_s)|I_{12}|}{|I_{11}| + |I_{12}|} \frac{2T_{dt}}{T_s}. \tag{17}$$

FIG. 8C shows that in the third mode of the third dead-time C, the processor 20 calculates the voltage compensation amounts $\Delta V_{33}$ of the control reference signal u according to a voltage compensation amount algorithm (18) below:

$$\Delta V_{33} = \frac{(E_d + e_s)|I_{13}|}{|I_{11}| + |I_{13}|} \frac{2T_{dt}}{T_s}. \tag{18}$$

In the voltage compensation amount algorithms (16) to (18), the voltage compensation amounts $\Delta V_{31}$, $\Delta V_{32}$ and $\Delta V_{33}$ are the voltage compensation amounts for the control reference signal u in the first mode, the second mode and the third mode of the third dead-time C, respectively, $E_d$ is the DC voltage at the input end, $e_s$ is the output voltage of the single-phase DC-AC inverter 10, $I_{11}$ is the first current value, $I_{12}$ is the second current value, $I_{13}$ is the third current value, $T_{dt}$ is the dead-time value of the first dead-time generator 29 and the second dead-time generator 30, and $T_s$ is the switch-switching period of the single-phase DC-AC inverter 10. After the control reference signal u is compensated using the voltage compensation amounts $\Delta V_{31}$, $\Delta V_{32}$ or $\Delta V_{33}$, the compensated control reference signal u' is generated. The compensated control reference signal u' and the triangular wave 25 are compared, the signals of the compensated first switch element S1' to the compensated fourth switch element S4' are generated. The single-phase DC-AC inverter 10 outputs the compensated AC voltage $V_{ab'}$, thereby reducing the effect of the third dead-time C on the AC voltage $V_{ab}$.

FIG. 8D shows that in the fourth mode of the third dead-time C, AC voltage $V_{ab}$ has no voltage loss, and voltage compensation is not needed.

FIGS. 9A to 9D are schematic diagrams of the inductor current i and the AC voltage $V_{ab}$ in the first mode to the fourth mode of the fourth dead-time D according to the present disclosure. When the fourth current value $I_{21}$ is greater than zero and the fifth current value $I_{22}$ is greater than zero, the fourth dead-time D is in the first mode (see FIG. 9D). When the fourth current value $I_{21}$ is greater than zero and the fifth current value $I_{22}$ is less than zero, the fourth dead-time D is in the second mode (see FIG. 9C). When the fourth current value $I_{21}$ is less than zero and the sixth current value $I_{23}$ is greater than zero, the fourth dead-time D is in the third mode (see FIG. 9B). When the fourth current value $I_{21}$ is less than zero and the sixth current value $I_{23}$ is less than zero, the fourth dead-time D is in the fourth mode (see FIG. 9A).

When in the fourth dead-time D of the AC voltage $V_{ab}$, the processor 20 calculates the fourth current value $I_{21}$, the fifth current value $I_{22}$ and sixth current value $I_{23}$ according to current value algorithms (19) to (21) below, respectively:

$$I_{21} = I_{20} - \frac{e_s + E_d}{L} \times \left(\frac{|u|T_s}{2} - T_{dt}\right), \tag{19}$$

$$I_{22} = I_{21} - \frac{e_s + E_d}{L} \times T_{dt}, \text{ and} \tag{20}$$

$$I_{23} = I_{21} - \frac{e_s}{L} \times T_{dt}, \tag{21}$$

wherein $I_{20}$ is the second inductor current value, $I_{21}$ is the fourth current value, $I_{22}$ is the fifth current value, the $I_{23}$ is the sixth current value, $E_d$ is the DC voltage at the input end, $e_s$ is the output voltage of the single-phase DC-AC inverter 10, L is the inductance value of the inductor L1, $T_{dt}$ is the dead-time value of the first dead-time generator 29 and the second dead-time generator 30, $T_s$ is the switch-switching period of the single-phase DC-AC inverter 10, and u is the control reference signal of the processor 20.

FIG. 9D shows that in the first mode of the fourth dead-time, the processor 20 calculates the voltage compensation amounts $\Delta V_{41}$ of the control reference signal u according to a voltage compensation amount algorithm (22) below:

$$\Delta V_{41} = -E_d \frac{2T_{dt}}{T_s}. \tag{22}$$

FIG. 9C shows that in the second mode of the fourth dead-time, the processor 20 calculates the voltage compensation amounts $\Delta V_{42}$ of the control reference signal u according to a voltage compensation amount algorithm (23) below:

$$\Delta V_{42} = -\frac{E_d|I_{21}| - e_s|I_{22}|}{|I_{21}| + |I_{22}|} \frac{2T_{dt}}{T_s}. \tag{23}$$

FIG. 9B shows that in the third mode of the fourth dead-time, the processor 20 calculates the voltage compensation amounts $\Delta V_{43}$ of the control reference signal u according to a voltage compensation amount algorithm (24) below:

$$\Delta V_{43} = \frac{e_s|I_{23}|}{|I_{21}| + |I_{23}|} \frac{2T_{dt}}{T_s}. \tag{24}$$

In the voltage compensation amount algorithms (22) to (24), the voltage compensation amounts $\Delta V_{41}$, $\Delta V_{42}$ and $\Delta V_{43}$ are the voltage compensation amounts for the control reference signal u in the first mode, the second mode and the third mode, respectively, $E_d$ is the DC voltage at the input end, $e_s$ is the output voltage of the single-phase DC-AC inverter 10, $I_{21}$ is the fourth current value, the $I_{22}$ is the fifth current value, $I_{23}$ is the sixth current value, $T_{dt}$ is the dead-time value of the first dead-time generator 29 and the second dead-time generator 30, and $T_s$ is the switch-switching period of the single-phase DC-AC inverter 10. After the control reference signal u is compensated using the voltage compensation amounts $\Delta V_{41}$, $\Delta V_{42}$ or $\Delta V_{43}$, the compensated control reference signal u' is generated. The compensated control reference signal u' and the triangular wave 25 are compared, and the signals of the compensated first switch element S1' to the compensated fourth switch element S4' are generated. The single-phase DC-AC inverter 10 outputs the compensated AC voltage $V_{ab'}$, thereby reducing the effect of the fourth dead-time D on the AC voltage $V_{ab}$.

FIG. 9A shows that in the fourth mode of the fourth dead-time D, the AC voltage $V_{ab}$ has no voltage loss, and voltage compensation is not needed.

In FIGS. 6A to 9D, the first dead-time A to the fourth dead-time D each have the first mode to the fourth mode, including a total of 16 situations, which have different determination conditions and correspond to different voltage compensation amounts $\Delta V$ that are used to compensate the control reference signal u. The voltage compensation amounts $\Delta V$ that are used to compensate the control reference signal u are calculated in the first mode to the fourth mode. The first switch element S1 to the fourth switch element S4 of the single-phase DC-AC inverter 10 are switched sequentially periodically. Therefore, the control reference signal u can be compensated using a corresponding voltage, thereby reducing the effects or interferences of the first dead-time A on the fourth dead-time D on the AC voltage $V_{ab}$, also reducing the inductance value of the inductor L1, and decreasing the volume of the inductor L1.

Figure 10A:
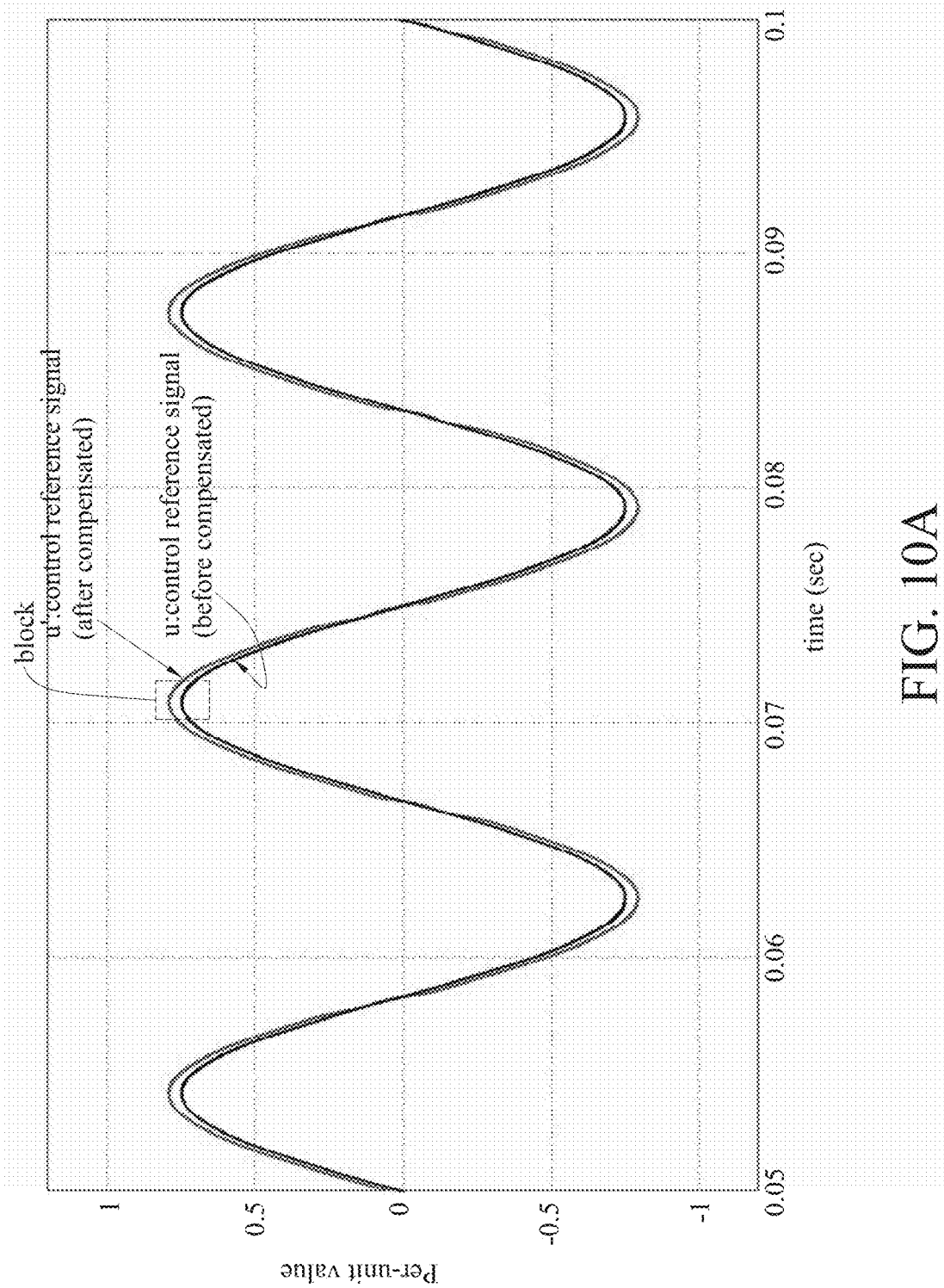
FIG. 10A shows waveform diagrams of the control reference signal before and after being compensated according to the present disclosure.
Figure 10B:
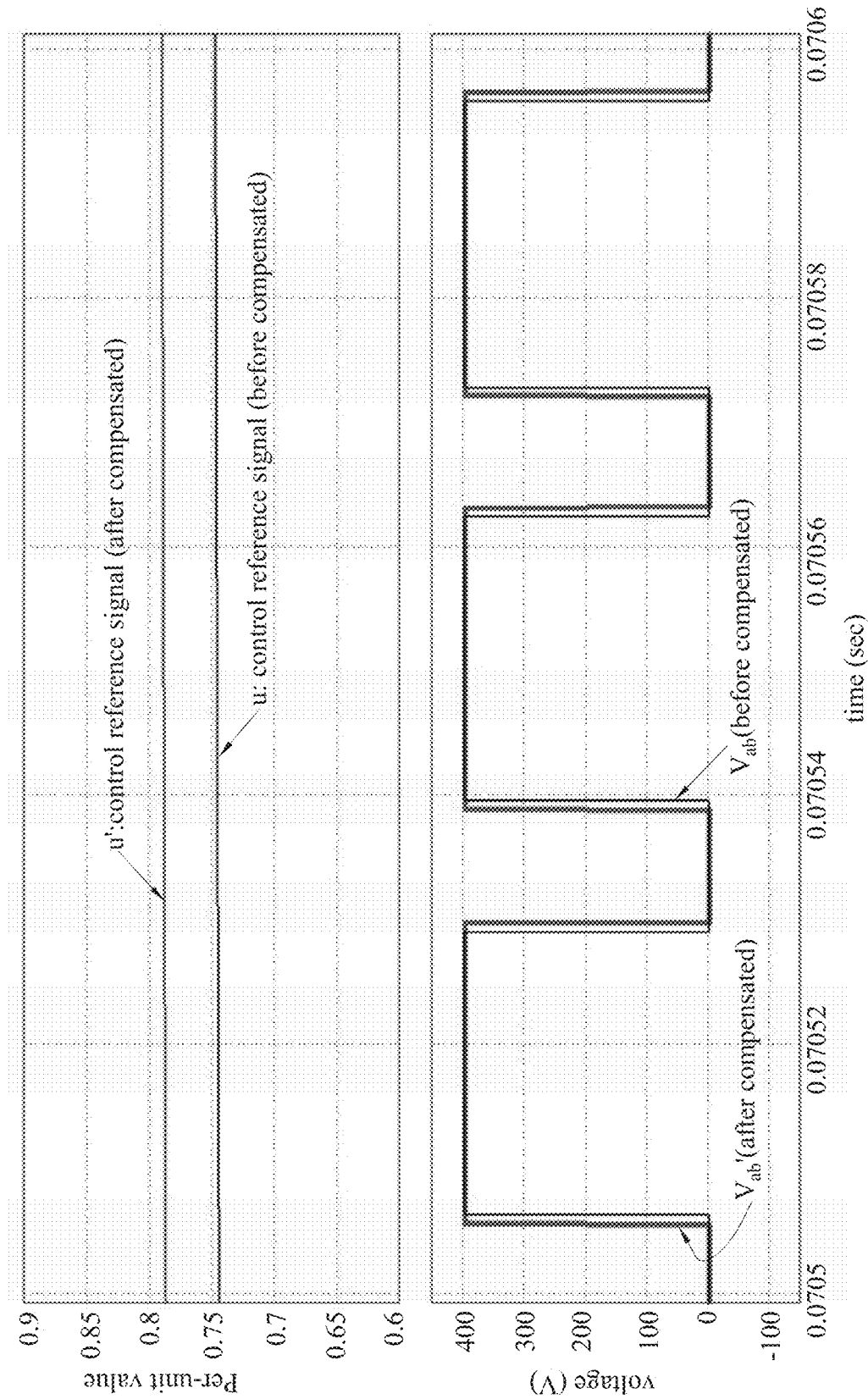
FIG. 10B enlarges the block of FIG. 10A, and shows the control reference signal that is not compensated yet, the compensated control reference signal, and their corresponding AC voltage according to the present disclosure.

FIG. 10A are waveform diagrams showing the control reference signal u that is not compensated yet and the compensated control reference signal u' according to the present disclosure. FIG. 10B enlarges the block of FIG. 10A that shows the control reference signal u that is not compensated yet and the compensated control reference signal u' and their corresponding AC voltages. The waveform diagram of $V_{ab}$ has a transverse axis denoting time, and a vertical axis denoting Per-unit value, which is a common numeral representation in power system analysis and engineering calculation and is equal to a ratio of an actual value (a nominal value) to a given standard value. As shown in FIG. 10B, the voltage compensation amounts $\Delta V$ calculated via the above-mentioned voltage compensation amount algorithms will be added to the original control reference signal u, to generate the compensated control reference signal u', so as to adjust the pulse width of the AC voltage $V_{ab}$ and generate compensated AC voltage $V_{ab'}$, thus reducing the effect of the first dead-time A on the fourth dead-time D on the AC voltage $V_{ab}$. The transverse axis denotes time (sec), the vertical axis of the upper diagram denotes Per-unit value, and the vertical axis of the lower diagram denotes voltage (volt). As a whole, the single-phase DC-AC inverter 10 converts a DC voltage into a unipolar AC voltage. The AC voltage $V_{ab}$ and the compensated AC voltage $V_{ab'}$ are also regarded as unipolar AC voltages.

Figure 11B:
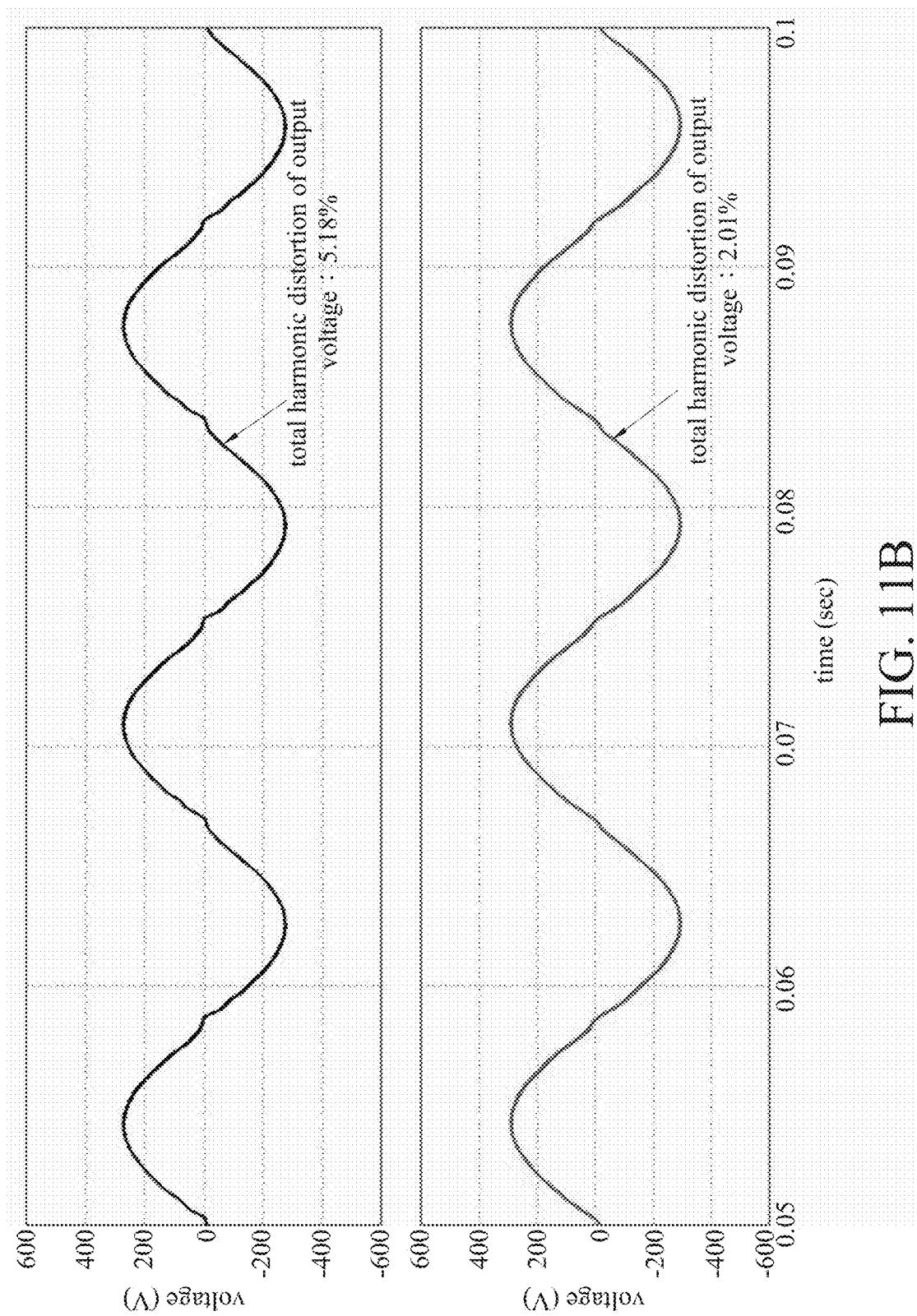
FIG. 11B is a waveform diagram of a simulated verification result of a dead-time voltage compensation apparatus and a dead-time voltage compensation method to an output voltage according to the present disclosure.

FIG. 11A is a simulated verification specification table of a dead-time voltage compensation apparatus and a dead-time voltage compensation method to an output voltage according to the present disclosure. FIG. 11B is a waveform diagram of a simulated verification result of a dead-time voltage compensation apparatus and a dead-time voltage compensation method to an output voltage according to the present disclosure.

As in the simulated verification specification table shown in FIG. 11A, the standard specification is DC voltage 400V at the input end, output voltage 200V (60 Hz), and a total harmonic distortion of the output voltage less than 3% under a linear load.

As in the simulated verification specification table shown in FIG. 11B, after the first dead-time A to the fourth dead-time D are compensated by using the voltage compensation amounts $\Delta V$, the total harmonic distortion 5.18% of the output voltage that is not compensated yet is improved to the total harmonic distortion 2.01% of the compensated output voltage.

In summary, a dead-time voltage compensation apparatus and a dead-time voltage compensation method according to the present disclosure have at least the following advantages.

The present disclosure can be applied to a single-phase DC-AC inverter (e.g., a single-phase off-grid DC-AC inverter), to calculate voltage losses due to the first dead-time to the fourth dead-time and compensate the original control reference signal in advance. The compensated control reference signal will adjust the pulse widths of the AC voltage, thereby reducing the voltage losses of the AC voltage and reducing the total harmonic distortion of the output voltage.

The present disclosure provides various voltage compensation amount algorithms to calculate the voltage compensation amounts in the first mode to the fourth mode, so as to achieve the effect of compensating the control reference signal, increases the compensation precision to the control reference signal, and reduces the effects of the first dead-time on the fourth dead-time on the AC voltage.

The present disclosure reduces the effects of the first dead-time on the fourth dead-time, reduces the inductance value and the volume of the inductor, saves the volume of the single-phase DC-AC inverter, and improves the performance of the single-phase DC-AC inverter.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A dead-time voltage compensation apparatus, comprising: a single-phase DC-AC inverter having an input end, a first switching module, a second switching module and an inductor, wherein the first switching module and the second switching module convert a DC voltage of the input end into a unipolar AC voltage; and a processor connected to the single-phase DC-AC inverter and configured for calculating a first current value, a second current value and a third current value based on a first inductor current value of the inductor, calculating voltage compensation amounts of a first dead-time and a third dead-time of an AC voltage and a second inductor current value of the inductor based on polarities of the first current value, the second current value and the third current value, calculating a fourth current value, a fifth current value and a sixth current value based on the second inductor current value of the inductor, calculating voltage compensation amounts of a second dead-time and a fourth dead-time of the AC voltage based on polarities of the fourth current value, the fifth current value and the sixth current value, and compensating a control reference signal of the processor based on the voltage compensation amounts of the first dead-time, the second dead-time, the third dead-time and the fourth dead-time of the AC voltage, wherein during the first dead-time, the AC voltage is greater than zero and from a standard value to a high level value of the AC voltage; during the second dead-time, the AC voltage is greater than zero and from the high level value to the standard value of the AC voltage; during the third dead-time, the AC voltage is less than zero and from the standard value to a low level value of the AC voltage; and during the fourth dead-time, the AC voltage is less than zero and from the low level value to the standard value of the AC voltage, and wherein the first inductor current value and the second inductor current value of the inductor are actual signals, and the first current value to the sixth current value are derived values.

2. The dead-time voltage compensation apparatus of claim 1, further comprising a sensor connected to the inductor of the single-phase DC-AC inverter and configured for sensing an inductor current of the inductor.

3. The dead-time voltage compensation apparatus of claim 1, further comprising a sensor connected to the input end of the single-phase DC-AC inverter and configured for sensing a DC voltage at the input end.

4. The dead-time voltage compensation apparatus of claim 1, further comprising a sensor connected to an output end of the single-phase DC-AC inverter and configured for sensing an output voltage at the output end.

5. The dead-time voltage compensation apparatus of claim 1, wherein the processor comprises an output voltage controller configured for generating a control signal based on an output voltage of the single-phase DC-AC inverter and a command corresponding to the output voltage.

6. The dead-time voltage compensation apparatus of claim 5, wherein the processor further comprises an output current controller configured for generating the control reference signal based on the control signal from the output voltage controller and an inductor current from the inductor of the single-phase DC-AC inverter.

7. The dead-time voltage compensation apparatus of claim 6, wherein the processor further comprises a dead-time voltage compensator configured for generating the voltage compensation amounts of the first dead-time, the second dead-time, the third dead-time and the fourth dead-time of the AC voltage based on the inductor current, the DC voltage and the output voltage from the single-phase DC-AC inverter.

8. The dead-time voltage compensation apparatus of claim 7, wherein the processor further comprises an adder configured for generating a compensated control reference signal based on the control reference signal from the output current controller and the voltage compensation amounts of the first dead-time, the second dead-time, the third dead-time and the fourth dead-time of the AC voltage from the dead-time voltage compensator.

9. The dead-time voltage compensation apparatus of claim 8, wherein the processor further comprises a triangular wave generator configured for generating a triangular wave and an inverter configured for changing the compensated control reference signal to an inverted compensated control reference signal.

10. The dead-time voltage compensation apparatus of claim 9, wherein the processor further comprises a first comparator configured for comparing positions of the compensated control reference signal and the triangular wave and a first dead-time generator configured for generating a dead-time to a first switch and a second switch of the single-phase DC-AC inverter based on the positions between the compensated control reference signal and the triangular wave relatively.

11. The dead-time voltage compensation apparatus of claim 10, wherein the processor further comprises a second comparator configured for positions of the inverted compensated control reference signal and the triangular wave and a second dead-time generator configured for generating a dead-time to a third switch and a fourth switch of the single-phase DC-AC inverter based on the positions between the inverted compensated control reference signal and the triangular wave relatively.

12. A dead-time voltage compensation method, comprising: converting a DC voltage of an input end of a single-phase DC-AC inverter into a unipolar AC voltage by using a first switching module and a second switching module of the single-phase DC-AC inverter; calculating, by using a processor, a first current value, a second current value and a third current value based on a first inductor current value of an inductor of the single-phase DC-AC inverter, and calculating voltage compensation amounts of a first dead-time and a third dead-time of an AC voltage and a second inductor current value of the inductor based on polarities of the first current value, the second current value and the third current value; calculating, by using the processor, a fourth current value, a fifth current value and a sixth current value based on the second inductor current value of the inductor, and calculating voltage compensation amounts of a second dead-time and a fourth dead-time of the AC voltage based on polarities of the fourth current value, the fifth current value and the sixth current value; and compensating, by using the processor, a control reference signal of the processor based on the voltage compensation amounts of the first dead-time, the second dead-time, the third dead-time and the fourth dead-time of the AC voltage, wherein during the first dead-time, the AC voltage is greater than zero and from a standard value to a high level value of the AC voltage; during the second dead-time, the AC voltage is greater than zero and from the high level value to the standard value of the AC voltage; during the third dead-time, the AC voltage is less than zero and from the standard value to a low level value of the AC voltage; and during the fourth dead-time, the AC voltage is less than zero and from the low level value to the standard value of the AC voltage, and wherein the first inductor current value and the second inductor current value of the inductor are actual signals, and the first current value to the sixth current value are derived values.

13. The dead-time voltage compensation method of claim 12, further comprising calculating, by using the processor, the first current value, the second current value and the third current value at the first dead-time of the AC voltage according to $$I_{11} = I_{10} - \frac{e_s}{L} \times \frac{(1-|u|)T_s}{4}, I_{12} = I_{11} - \frac{e_s}{L} \times T_{dt}$$

and $$I_{13} = I_{11} - \frac{e_s - E_d}{L} \times T_{dt},$$

respectively, wherein $I_{10}$ is the first inductor current value, $I_{11}$ is the first current value, $I_{12}$ is the second current value, $I_{13}$ is the third current value, $E_d$ is the DC voltage at the input end, $e_s$ is an output voltage of the single-phase DC-AC inverter, L is an inductance value of the inductor, $T_{dt}$ is a dead-time value of a first dead-time generator and a second dead-time generator, $T_s$ is a switch-switching period of the single-phase DC-AC inverter, and u is the control reference signal of the processor.

14. The dead-time voltage compensation method of claim 13, further comprising calculating, by using the processor, voltage compensation amounts $\Delta V_{11}$, $\Delta V_{12}$ and $\Delta V_{13}$ of the control reference signal in a first mode, a second mode and a third mode of the first dead-time according to $$\Delta V_{11} = -E_d \frac{2T_{dt}}{T_s},$$

$$\Delta V_{12} = -\frac{E_d|I_{11}| + (E_d - e_s)|I_{12}|}{|I_{11}| + |I_{12}|} \frac{2T_{dt}}{T_s}$$

and $$\Delta V_{13} = -\frac{(E_d - e_s)|I_{13}|}{|I_{11}| + |I_{13}|} \frac{2T_{dt}}{T_s},$$

respectively, wherein the voltage compensation amounts $\Delta V_{11}$, $\Delta V_{12}$ and $\Delta V_{13}$ are the voltage compensation amounts of the control reference signal in the first mode, the second mode and the third mode of the first dead-time, respectively, $E_d$ is the DC voltage at the input end, $e_s$ is the output voltage of the single-phase DC-AC inverter, $I_{11}$ is the first current value, $I_{12}$ is the second current value, $I_{13}$ is the third current value, $T_{dt}$ is the dead-time value of the first dead-time generator and the second dead-time generator, and $T_s$ is the switch-switching period of the single-phase DC-AC inverter.

15. The dead-time voltage compensation method of claim 12, further comprising calculating, by using the processor, the fourth current value, the fifth current value and the sixth current value at the second dead-time of the AC voltage according to $$I_{21} = I_{20} - \frac{e_s - E_d}{L} \times \left(\frac{|u|T_s}{2} - T_{dt}\right),$$

$$I_{22} = I_{21} - \frac{e_s - E_d}{L} \times T_{dt}$$

and $$I_{23} = I_{21} - \frac{e_s}{L} \times T_{dt},$$

respectively, wherein $I_{20}$ is the second inductor current value, $I_{21}$ is the fourth current value, $I_{22}$ is the fifth current value, $I_{23}$ is the sixth current value, $E_d$ is the DC voltage at the input end, $e_s$ is an output voltage of the single-phase DC-AC inverter, L is an inductance value of the inductor, $T_{dt}$ is a dead-time value of a first dead-time generator and a second dead-time generator, $T_s$ is a switch-switching period of the single-phase DC-AC inverter, and u is the control reference signal of the processor.

16. The dead-time voltage compensation method of claim 15, further comprising calculating, by using the processor, voltage compensation amounts $\Delta V_{21}$, $\Delta V_{22}$ and $\Delta V_{23}$ of the control reference signal in a first mode, a second mode and a third mode of the second dead-time according to $$\Delta V_{21} = E_d \frac{2T_{dt}}{T_s},$$

$$\Delta V_{22} = \frac{E_d|I_{21}| + e_s|I_{22}|}{|I_{21}| + |I_{22}|} \frac{2T_{dt}}{T_s}$$

and $$\Delta V_{23} = \frac{e_s|I_{13}|}{|I_{21}| + |I_{23}|} \frac{2T_{dt}}{T_s},$$

respectively, wherein the voltage compensation amounts $\Delta V_{21}$, $\Delta V_{22}$ and $\Delta V_{23}$ are the voltage compensation amounts of the control reference signal in the first mode, the second mode and the third mode of the second dead-time, respectively, $E_d$ is the DC voltage of the input end, $e_s$ is the output voltage of the single-phase DC-AC inverter, $I_{21}$ is the fourth current value, $I_{22}$ is the fifth current value, $I_{23}$ is the sixth current value, $T_{dt}$ is the dead-time value of the first dead-time generator and the second dead-time generator, and $T_s$ is the switch-switching period of the single-phase DC-AC inverter.

17. The dead-time voltage compensation method of claim 12, further comprising calculating, by using the processor, the first current value, the second current value and the third current value at the third dead-time of the AC voltage according to $$I_{11} = I_{10} - \frac{e_s}{L} \times \frac{(1-|u|)T_s}{4},$$

$$I_{12} = I_{11} - \frac{e_s}{L} \times T_{dt}$$

and $$I_{13} = I_{11} - \frac{e_s + E_d}{L} \times T_{dt},$$

respectively, wherein $I_{10}$ is the first inductor current value, $I_{11}$ is the first current value, $I_{12}$ is the second current value, $I_{13}$ is the third current value, $E_d$ is the DC voltage of the input end, $e_s$ is an output voltage of the single-phase DC-AC inverter, L is an inductance value of the inductor, $T_{dt}$ is a dead-time value of a first dead-time generator and a second dead-time generator, $T_s$ is a switch-switching period of the single-phase DC-AC inverter, and u is the control reference signal of the processor.

18. The dead-time voltage compensation method of claim 17, further comprising calculating, by using the processor, voltage compensation amounts $\Delta V_{31}$, $\Delta V_{32}$ and $\Delta V_{33}$ of the control reference signal in a first mode, a second mode and a third mode of the third dead-time according to $$\Delta V_{31} = E_d \frac{2T_{dt}}{T_s},$$

$$\Delta V_{32} = \frac{E_d|I_{11}| + (E_d + e_s)|I_{12}|}{|I_{11}| + |I_{12}|} \frac{2T_{dt}}{T_s}$$

and $$\Delta V_{33} = \frac{(E_d + e_s)|I_{13}|}{|I_{11}| + |I_{13}|} \frac{2T_{dt}}{T_s},$$

respectively, wherein the voltage compensation amounts $\Delta V_{31}$, $\Delta V_{32}$ and $\Delta V_{33}$ are the voltage compensation amounts of the control reference signal in the first mode, the second mode and the third mode of the third dead-time, respectively, $E_d$ is the DC voltage of the input end, $e_s$ is the output voltage of the single-phase DC-AC inverter, $I_{11}$ is the first current value, $I_{12}$ is the second current value, $I_{13}$ is the third current value, $T_{dt}$ is the dead-time value of the first dead-time generator and the second dead-time generator, and $T_s$ is the switch-switching period of the single-phase DC-AC inverter.

19. The dead-time voltage compensation method of claim 12, further comprising calculating, by using the processor, the fourth current value, the fifth current value and the sixth current value at the fourth dead-time of the AC voltage according to $$I_{21} = I_{20} - \frac{e_s + E_d}{L} \times \left(\frac{|u|T_s}{2} - T_{dt}\right),$$

$$I_{22} = I_{21} - \frac{e_s + E_d}{L} \times T_{dt}$$

and $$I_{23} = I_{21} - \frac{e_s}{L} \times T_{dt},$$

respectively, wherein $I_{20}$ is the second inductor current value, $I_{21}$ is the fourth current value, $I_{22}$ is the fifth current value, $I_{23}$ is the sixth current value, $E_d$ is the DC voltage of the input end, $e_s$ is an output voltage of the single-phase DC-AC inverter, L is an inductance value of the inductor, $T_{dt}$ is a dead-time value of a first dead-time generator and a second dead-time generator, $T_s$ is a switch-switching period of the single-phase DC-AC inverter, and u is the control reference signal of the processor.

20. The dead-time voltage compensation method of claim 19, further comprising calculating, by using the processor, voltage compensation amounts $\Delta V_{41}$, $\Delta V_{42}$ and $\Delta V_{43}$ of the control reference signal in a first mode, a second mode and a third mode of the fourth dead-time according to $$\Delta V_{41} = -E_d \frac{2T_{dt}}{T_s},$$

$$\Delta V_{42} = -\frac{E_d|I_{21}| - e_s|I_{22}|}{|I_{21}| + |I_{22}|} \frac{2T_{dt}}{T_s}$$

and $$\Delta V_{43} = \frac{e_s|I_{23}|}{|I_{21}| + |I_{23}|} \frac{2T_{dt}}{T_s},$$

respectively, wherein the voltage compensation amounts $\Delta V_{41}$, $\Delta V_{42}$ and $\Delta V_{43}$ are the voltage compensation amounts of the control reference signal in the first mode, the second mode and the third mode of the fourth dead-time, respectively, $E_d$ is the DC voltage of the input end, $e_s$ is the output voltage of the single-phase DC-AC inverter, $I_{21}$ is the fourth current value, $I_{22}$ is the fifth current value, $I_{23}$ is the sixth current value, $T_{dt}$ is the dead-time value of the first dead-time generator and the second dead-time generator, and $T_s$ is the switch-switching period of the single-phase DC-AC inverter.

* * * * *